US008292980B2

(12) United States Patent

Yamagishi et al.

(10) Patent No.: US 8,292,980 B2

(45) Date of Patent: Oct. 23, 2012

(54) DUST CAPTURE DEVICE AND PROJECTION TYPE IMAGE DISPLAY APPARATUS

(75) Inventors: Shigekazu Yamagishi, Osaka (JP); Shingo Oidate, Osaka (JP); Masato Tanaka, Kyoto (JP); Mitsuru Kotaka, Osaka (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 12/564,235

(22) Filed: Sep. 22, 2009

(65) Prior Publication Data

US 2010/0077926 A1 Apr. 1, 2010

(30) Foreign Application Priority Data

Sep. 26, 2008 (JP) ................................ 2008-247836
Nov. 18, 2008 (JP) ................................ 2008-294781

(51) Int. Cl.
*B01D 46/00* (2006.01)
*G03B 21/16* (2006.01)

(52) U.S. Cl. ................ 55/354; 55/283; 55/290; 55/295; 55/351; 55/385.1; 95/277; 95/278; 96/425; 96/429; 353/57; 353/61

(58) Field of Classification Search .................... 55/283, 55/289, 290, 295, 296, 297, 304, 351, 352, 55/354, 385.1; 95/277, 278, 282; 96/420, 96/423, 425, 429; 353/57, 61
See application file for complete search history.

(56) References Cited

U.S. PATENT DOCUMENTS 3,337,898 A * 8/1967 Zador et al. ..................... 15/404
4,435,909 A * 3/1984 Williamson, Jr. ................. 34/82
4,521,230 A * 6/1985 Strong ............................ 96/418
7,527,680 B2 * 5/2009 Horiguchi et al. .............. 96/422
2010/0277701 A1 * 11/2010 Yamamoto ...................... 353/57
2010/0328620 A1 * 12/2010 Yamamoto ...................... 353/57

FOREIGN PATENT DOCUMENTS

JP 4-205775 A 7/1992
JP 5-049830 A 3/1993
JP 6-039225 A 2/1994

* cited by examiner

*Primary Examiner* — Robert Clemente

(74) *Attorney, Agent, or Firm* — Hamre, Schumann, Mueller & Larson, P.C.

(57) ABSTRACT

The present invention includes: a rolled filter stretched between first and second winding shafts and, unused part of the filter being wound around the second winding shaft; a brush provided between the first and the second winding shafts so as to come into contact with a surface of the filter; a feeding mechanism for driving the first and the second winding shafts to take up or rewind the filter; and a feeding control unit for controlling the feeding mechanism. When activating a renewing operation for feeding unused part of the filter from the second winding shaft, the feeding control unit controls the feeding mechanism such that once the filter is taken up by the first winding shaft by an take-up amount La, the filter is rewound by the second winding shaft by a rewind amount Lb, and La and Lb satisfy a relationship La≧Lb. Without increasing the amount of the filter or the size of the device itself, the present invention can deliver adequate performance even in a dusty environment by a small number of filter renewing operations.

32 Claims, 14 Drawing Sheets

DUST CAPTURE DEVICE AND PROJECTION TYPE IMAGE DISPLAY APPARATUS

BACKGROUND OF INVENTION

1. Field of the Invention

The present invention relates to dust capture devices using a filter, in particular to a dust capture device having the capability of automatically renewing and cleaning a filter, and a projection type image display apparatus using the dust capture device.

2. Description of Related Art

Projection type image display apparatuses such as a projector include image display elements, such as a liquid crystal panel and a digital mirror device (DMD), and produce large-screen images by concentrating strong light from a light source, such as a lamp, onto the image display elements, and magnifying and projecting optical images formed by modulating the strong light in accordance with input image signals.

The image display elements that are subjected to strong light, the light source itself, the device power supply and the like generate a large amount of heat. Thus, they may be damaged thermally unless they are cooled appropriately. Therefore, projection type image display apparatuses generally utilize a configuration such that the inside thereof is cooled by introducing outside air through an air intake using a fan.

However, dust also may be introduced to the inside together with the outside air. The adhesion of the dust to optical parts, such as the image display elements and prisms, and to parts in the vicinity of the light source causes a reduction in luminance and color unevenness. Hence, a filter for capturing the dust is disposed at the air intake. A urethane filter that is used primarily as such a filter, however, needs to be cleaned every several hundred hours. Further, an electrostatic filter that can collect much smaller dust cannot be cleaned, so that it needs to be replaced with a new filter every several hundred hours.

On the other hand, most of the projection type image display apparatuses are used by being hung on the ceiling, in other words, they are placed at an elevated position. Consequently, since they are not in an installed position where filter renewal can be carried out easily, the filters may not be always in an adequate condition.

The urethane filter prevents the entry of dust by capturing the dust physically with small openings but it cannot prevent the entry of dust smaller than 10 μm. Therefore, the urethane filter cannot prevent the entry of yellow sand or cigarette smoke particles. In contrast, the electrostatic filter can capture small dust because the dust is captured using static electricity, while it has openings that greatly suppress loss of pressure.

In view of the situations as above, JP H5-49830 A, for example, discloses the following structure as a solution to a similar problem.

According to JP H5-49830 A, an electrostatic filter for an ozone deodorizing device is formed in a long belt shape and is stretched between two rotation rollers windably. The electrostatic filter wound around one of the rotation rollers is taken up automatically by the other rotation roller using a driving motor in accordance with the deodorizing operation time.

In this way, by using the take-up type electrostatic filter and taking up the filter in accordance with the operation time, the unused part of the electrostatic filter is moved to a ventilating unit, and thereby the number of filter renewing operations can be reduced.

It appears that by applying the configuration disclosed in JP H5-49830 A to a projector, a time interval between filter renewing operations similarly can be extended. However, even when the electrostatic filter itself is still in a state of having a dust capture capability, the effect of static electricity cannot be achieved when a large amount of dust adheres to the filter. As a result, dust may enter the device without being captured.

Thus, the electrostatic filter needs to be renewed in a brief period of time in a dusty environment unless the size of a space for housing the filter is increased.

However, an increase in the size of the space for housing the filter results in an increase in the size of the projection type image display itself, and furthermore, the usage of the filter increases. These go against the recent trend of space and resource savings.

SUMMARY OF THE INVENTION

With foregoing in mind, an object of the present invention is to solve the above conventional problems and provide a dust capture device that can deliver adequate performance even in a dusty environment by a small number of filter renewing operations, without increasing the amount of the filter or the size of the device itself.

In order to solve the above problems, the dust capture device of the present invention includes: first and second winding shafts disposed at a predetermined spacing; a rolled filter stretched between the first and the second winding shafts, an unused part of the filter being wound around the second winding shaft; a brush provided at a predetermined position between the first and the second winding shafts so as to come into contact with a surface of the filter; a feeding mechanism for driving the first and the second winding shafts to take up or rewind the filter through the first and the second winding shafts; and a feeding control unit for controlling the feeding mechanism. When activating a renewing operation for feeding the unused part of the filter from the second winding shaft, the feeding control unit controls the feeding mechanism such that once the filter is taken up by the first winding shaft by an take-up amount La, the filter is rewound by the second winding shaft by a rewind amount Lb, and La and Lb satisfy the relationship $La \geqq Lb$.

According to the present invention, not only fine dust can be removed by the electrostatic filter but also the filter is always in a favorable condition by being automatically renewed and cleaned even over long hours of use. Thus, the dust removing capability can be maintained for long hours without putting time and effort into the maintenance of the device.

At the same time, the present invention has a favorable storage ability because there is no need to increase the amount of the filter. Thus, it easily can be downsized and a variety of models can be developed.

DETAILED DESCRIPTION OF THE INVENTION

Figure 1:
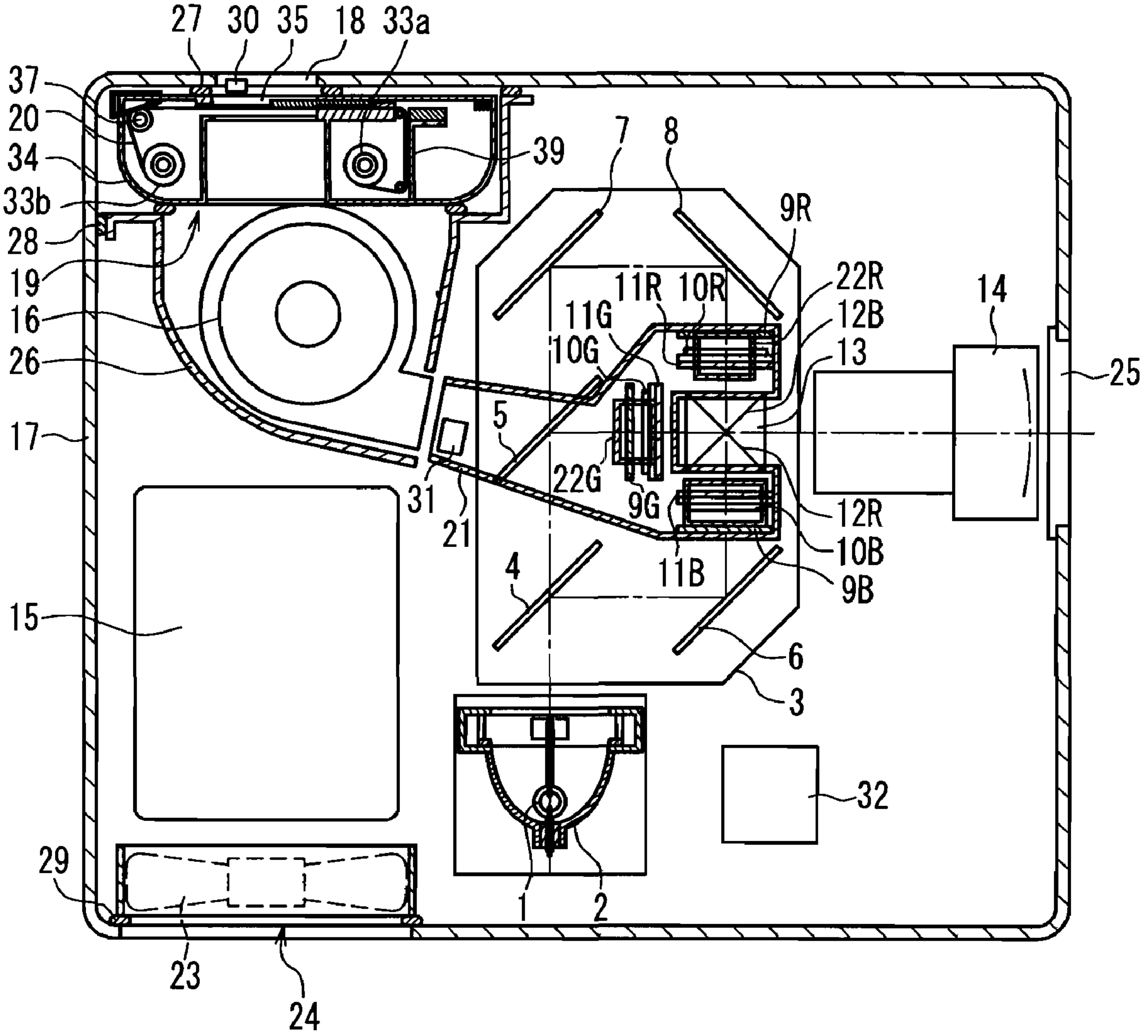
FIG. 1 is a cross-sectional view showing the overall planar configuration of a projection type image display apparatus according to Embodiment 1 of the present invention.

The present invention, having the basic structure as described above, can be configured as follows.

That is, it is preferable that the dust capture device having the above configuration further includes a small housing for storing at least the filter, the first and the second winding shafts, and the brush, the small housing including an opening facing the surface of the filter at a position between the first and the second winding shafts.

Further, it is preferable that when a length of the opening of the small housing in a feeding direction of the filter is Lc, La and Lc satisfy the relationship La≧Lc.

Further, the brush may be disposed between an end of the opening of the small housing on a first winding shaft side and the first winding shaft.

Further, the brush may be disposed linearly in the same direction as the feeding direction of the filter.

Further, the brush may be provided on a shaft including a rotation shaft in a direction orthogonal to the feeding direction of the filter. In this case, the brush may be rotated in a direction opposite to the feeding direction of the filter.

Further, the brush may be composed of a movable brush that can be moved and a fixed brush that is fixed, and the movable brush moves in association with movement of the filter so as to come into contact with the fixed brush. In this case, the movable brush may be stopped from moving while the filer is rewound by the second filter winding shaft and captures dust adhered to the surface of the filter.

Further, when the filter is taken up by the first winding shaft, the movable brush may move in association with movement of the filter and temporarily passe a position of the fixed brush, and next time when the filter is rewound by the second winding shaft, the movable brush may move in association with movement of the filter and come into contact with the fixed brush, so that the captured dust is removed.

Further, the movable brush and the fixed brush are magic brushes having slant hair.

Further, the small housing may include a dust storage unit separated from a storage position of the filter by a separation wall. In this case, a separation wall may be provided between the brush and the dust storage unit. Further, the dust storage unit is provided with a plurality of partitions and the plurality of partitions are disposed such that dust is not accumulated in one side. In this case, the plurality of partitions provided in the dust storage unit may be provided in a direction orthogonal to a direction of the rotation shaft of the brush.

Further, an openable discharge opening for dust may be provided in the dust storage unit of the small housing.

Further, the filter is an electrostatic filter. In this case, the electrostatic filter may be composed of an electrified fiber surface and a mesh surface, and a surface with which the brush comes into contact may be the mesh surface.

Further, it is preferable that a condition for activating the renewing operation by the feeding control unit is set on the basis of an output of a temperature sensor for detecting a temperature of air prior to passing through the filter and an output of an air volume sensor for detecting a volume of air that passed through the filter.

Further, it is preferable that the air volume sensor includes a heat receiving unit and a heat generating unit so that a change in output of the heat receiving unit due to air passing through between the heat receiving unit and the heat generating unit corresponds to an air volume, and the feeding control unit activates the renewing operation when a temperature difference calculated from values determined by converting outputs of the air volume sensor and those of the temperature sensor into Celsius degrees exceeds a predetermined value.

Further, it is preferable that the relationship between the take-up amount La and the rewind amount Lb can be set variably in accordance with the respective time intervals among a plurality of times at which the renewing operation is activated.

Further, it is preferable that along with the condition set on the basis of the outputs of the temperature sensor and the air volume sensor, the feeding control unit uses a passage of a predetermined operating time as a condition for activating the renewing operation to control the feeding mechanism.

Further, it is preferable that the dust capture device of the present invention includes an air intake fan for intaking outside air through the surface of the filter at the opening, and when the feeding control unit detects that the condition for activating the renewing operation on the basis of the outputs of the temperature sensor and the air volume sensor is satisfied, at first the feeding control unit controls to increase a rotation speed of the air intake fan to a predetermined value without driving the first and the second winding shafts, and when the feeding control unit detects again that the condition for activating the renewing operation is satisfied, then the feeding control unit controls to drive the first and the second winding shafts.

Further, it is preferable that when a remaining amount of the unused part of the filter wound around the second winding shaft decreases and La cannot be secured or the remaining amount reaches a predetermined value, a warning about the remaining amount of unused part of the filter is displayed to a user.

Further, it is preferable that when the condition for activating the renewing operation is satisfied in a state where a remaining amount of unused part of the filter wound around the second winding shaft is decreased and La cannot be secured or the remaining amount reaches a predetermined value, the feeding mechanism is controlled by reducing the take-up amount La so that La becomes equal to Lb.

Further, it is preferable that the feeding control unit calculates an estimated value of useable remaining time of the filter on the basis of the respective time intervals among the plurality of times at which the renewing operation is activated.

Further, when k represents a number of the renewing operations performed from the beginning of use of the filter, ΣUt represents cumulative use time from the beginning of use of the filter, Pm represents maximum partial use time assumed to be the maximum time in which part of the filter can be used by one renewing operation, and N represents a number of the renewing operations performable for a total length of the filter, the estimated value of the usable remaining time Rt can be calculated by the following formula:

$$Rt=[\{\Sigma Ut+(N+1-k)\times Pm\}/(N+1)]\times(N+1-k).$$

Further, it is preferable that when the filter is kept used without being renewed after the useable remaining time is displayed once, the feeding control unit performs such control that the usable remaining time is displayed again when the usable remaining time becomes equal to or less than a setting value, thereafter the usable remaining time is displayed repeatedly for a predetermined number of times at a predetermined time interval, and subsequently power of a device using the dust capture device is turned off.

The dust capture device of the present invention can be configured such that when the renewing operation cannot be completed, the user is notified of the situation by a display.

The dust capture device of the present invention can be configured such that when the renewing operation cannot be completed, power of an apparatus using the power dust capture device is once turned off, and after the power is turned again, operation of the powder capture device starts from a take-up operation by the first winding shaft regardless of an operation state prior to the power down.

The projection type image display apparatus of the present invention includes a housing having at least an air intake and an exhaust, a blower unit for intaking or exhausting air, a light source unit, an image forming unit, a projection optical system, a power supply unit, and the dust capture device of the present invention.

Further, the dust capture device may be detachable from a main body of the projection type image display apparatus.

Further, the air intake of the projection type image display apparatus and the opening of the small housing of the dust capture device may have substantially the same size.

Hereinafter, embodiments of the present invention will be described with reference to the drawings.

Embodiment 1

FIG. 1 is a cross-sectional view showing the overall planar configuration of a projection type image display apparatus according to Embodiment 1 of the present invention. The present embodiment is directed to improvements in a dust capture device used in a projection type image display apparatus, in particular to controlling the operation of the dust capture device. Therefore, since there are no specific limitations to the optical configuration, a typical optical configuration may be used in the present embodiment. Accordingly, in the following description, the optical configuration will be discussed only briefly.

In FIG. 1, light emitted by a lamp 1 as a light source is reflected by a reflection mirror 2 frontwards, and enters an optical unit 3. The incident light is separated into red, green and blue colored light beams through dichroic mirrors 4 and 5 and total reflection mirrors 6, 7 and 8.

Subsequently, the intensity of the respective colored light beams is modulated by corresponding incident-side polarizers 9R, 9G and 9B, liquid crystal panels 10R, 10G and 10B as image display elements, and eject-side polarizers 11R, 11G, and 11B on the basis of external input signals (not shown).

These light beams are combined in an optical path by a combine prism 13 including dichroic reflection films 12R and 12B, and then the combined light beam enters a projection lens 14. The projection lens 14 is designed to magnify images on the liquid crystal panels 10R, 10G and 10B and to project them on a screen (not shown) placed in front of the device.

In order to display black at the time of displaying the images, light from the lamp 1 needs to be absorbed by the incident-side polarizers 9R, 9G and 9B and the eject-side polarizers 11R, 11G and 11B, so that these polarizers generate a high temperature. Further, these polarizers primarily are made of an organic material. Thus, unless they are cooled down to an appropriate temperature, their quality deteriorates, so that images no longer can be controlled and they become unusable.

Further, elements with large self heat generation, such as the lamp 1 whose temperature reaches up to 1000° C. at the time of light emission, mechanical parts in the vicinity of the lamp 1 and the power supply unit 15 required for lighting the lamp 1 and displaying images, are placed in the apparatus. Consequently, a cooling means is required in order to ensure the reliability of these elements.

Accordingly, in the present embodiment, outside air (air with a relatively low temperature) is introduced into the apparatus through a housing air intake 18 formed in a side wall of a housing 17 by an air intake fan 16 as an air blower. The outside air taken in by the air intake fan 16 is introduced, through an electrostatic filter 20 of a dust capture unit 19, to an optical unit duct 21 being in intimate contact with a blowoff opening of the fan.

The optical unit duct 21 is provided with an aperture for red channel 22R, an aperture for green channel 22G and an aperture for blue channel 22B at the positions respectively corresponding to the bottom of the incident-side polarizers 9R, 9G and 9B, the liquid crystal panels 10R, 10G and 10B and the eject-side polarizers 11R, 11G and 11B.

The air issued from these apertures 22R, 22 G and 22B takes away heat from the incident-side polarizers 9R, 9G and 9B, the liquid crystal panels 10R, 10G and 10B and the eject-side polarizers 11R, 11G and 11B, and then is exhausted by an exhaust fan 23. During this process, the air to be exhausted also takes away heat from the lamp 1, the mechanical parts in the vicinity of the lamp 1 and the power supply unit 15. The air arrived at the exhaust fan 23 is exhausted from the apparatus through an exhaust 24 formed in a side wall of the housing 17.

In such a cooling process, external dust taken in together with outside air adheres to portions in the vicinity of the liquid crystal panels and the light source unit, and may cause problems such as early deterioration of luminance and color unevenness in projected images as a result. In order to prevent these problems, the dust capture unit 19 is provided between the housing air intake 18 and the air intake fan 16.

Further, as a housing structure preventing dust from entering through clearances, the projection type image display apparatus of the present invention employs a structure in which the projection lens 14 is completely housed in the housing 17 and, at a light transmission unit, a window member 25 is attached to the housing 17 with no clearance. Furthermore, buffer materials 27, 28 and 29 through which air cannot pass are respectively provided between the housing air intake 18 and the dust capture unit 19, between the dust capture unit 19 and an air intake duct 26 covering the air intake fan 16, and between the exhaust 24 and the exhaust fan 23, so that outside air is necessarily taken in through the dust capture unit 19.

As elements for gathering data for controlling the operation of the dust capture unit 19, an outside air temperature sensor 30 and an air volume sensor 31 are provided. Outputs from these sensors are supplied to a control circuit unit 32 having the function of controlling the entire operation of the projection type image display apparatus. The control circuit unit 32 controls the dust capture unit 19 on the basis of the outputs from these sensors.

The outside air temperature sensor 30 is placed at the housing air intake 18. The air volume sensor 31 is placed in the vicinity of the outlet port of the air intake fan 16. Or, an air duct for measuring an air volume may be formed and the air volume sensor 31 may be installed in the air duct.

The air volume sensor 31 may have a generally-used structure, for example, in which a heat generating unit and a heat receiving unit facing the heat generating unit are provided and air passes through between the both units. A temperature detecting element is used for the heat receiving unit. That is, in this structure, an air volume is detected on the basis of a change in temperature detected by the heat receiving unit due to a change in cooling effect by an air current in accordance with the air volume. Thus, the detected temperature corresponds to the air volume. A change in the property due to an outside air temperature is compensated on the basis of the outside air temperature detected by the outside air temperature sensor 30. It should be noted that air volume sensors having a configuration different from the above also can be used.

The air volume sensor 31 is used to detect the degree of clogging of the electrostatic filter 20. When the output of a motor that drives the air intake fan 16 is constant, the volume of air taken in by the air intake fan 16 changes in accordance with the degree of clogging of the electrostatic filter 20. In other words, as the degree of clogging of the electrostatic filter 20 becomes higher, the air volume detected by the air volume sensor 31 declines, so that the value of the detected temperature corresponding to the air volume increases.

Figure 2:
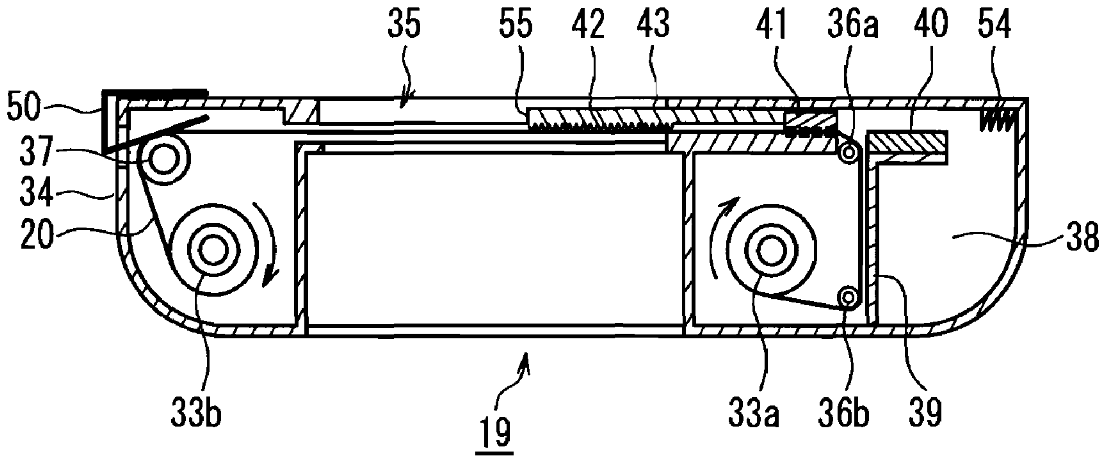
FIG. 2 is a cross-sectional view showing the structure of a dust capture unit of the projection type image display apparatus.

Hereinafter, the structure of the dust capture unit 19 will be described with reference to FIG. 2. FIG. 2 is an enlarged plan cross-sectional view showing the dust capture unit 19. The dust capture unit 19 is composed of a dust capture filter unit, a filter cleaning unit and a feeding mechanism control unit including a filter feeding mechanism and a filter feed amount detection means.

The dust capture filter unit is composed of the rolled electrostatic filter 20, first and second winding shafts 33*a* and 33*b* respectively placed at the both ends of the electrostatic filter 20 and a small housing 34 that houses the electrostatic filter 20 and the first and second winding shafts 33*a* and 33*b* and includes a coupling unit coupled to the filter feeding mechanism.

The small housing 34 includes an opening 35 having a size substantially the same as that of the housing air intake 18 and allowing an air from the housing air intake 18 to flow in. The opening 35 is provided between the first and the second winding shafts 33*a* and 33*b*. Furthermore, guide shafts 36*a* and 36*b* for guiding the electrostatic filter 20 and a feed amount monitor shaft 37 are placed between the first and second winding shafts 33*a* and 33*b*.

The filter cleaning unit is composed of a separation wall 39 for forming a dust storage unit 38 by spatially separating the filter cleaning unit from the dust capture filter unit, a fixed brush 40 attached to part of the separation wall 39 and a movable brush 41 facing the fixed brush 40.

Figure 3:
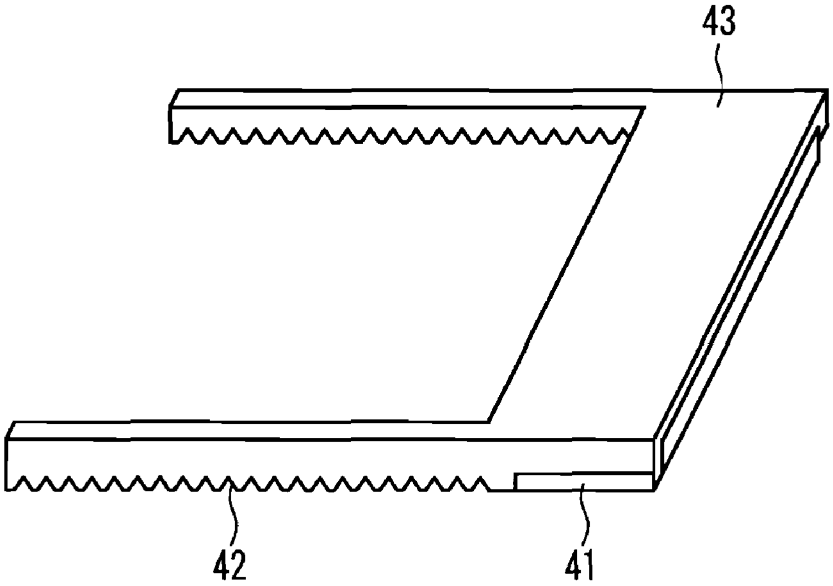
FIG. 3 is a perspective view showing the appearance of a movable brush in the dust capture unit.

As shown in the external perspective view of FIG. 3, the movable brush 41 is attached to a conveyor unit 43 including contact units 42 for achieving stable friction with the electrostatic filter 20. The conveyor unit 43 is provided movably by the friction contact with the electrostatic filter 20 in accordance with the movement of the electrostatic filter 20.

Figure 4:
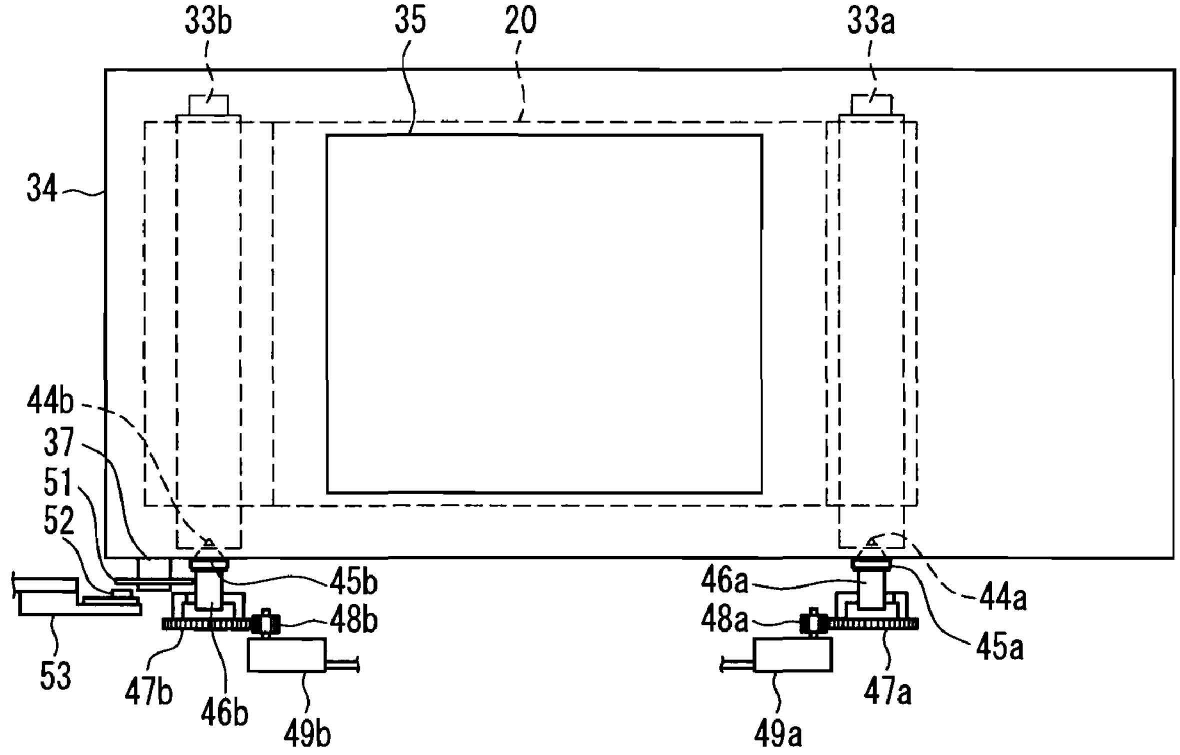
FIG. 4 is a plan view schematically showing the configuration of a filter feeding mechanism in the dust capture unit.

The filter feeding mechanism is composed of a driving unit including a motor, and a coupling unit for coupling the first and the second winding shafts 33*a* and 33*b* to the driving unit. FIG. 4 is a plan view schematically showing the configuration of the filter feeding mechanism.

As shown in FIG. 4, the end portions of the first and the second winding shafts 33*a* and 33*b* are provided respectively with recessed portions 44*a* and 44*b*, and coupling units 45*a* and 45*b* respectively are inserted in the recessed portions 44*a* and 44*b*. Because of these coupling units 45*a* and 45*b*, the small housing 34 enclosing the electrostatic filter 20 can be attached to and detached from the main body of the device.

Gears 47*a* and 47*b* respectively are fixed to the coupling units 45*a* and 45*b* through shafts 46*a* and 46*b*. The gears 47*a* and 47*b* respectively are connected to stepping motor units 49*a* and 49*b* through small gears 48*a* and 48*b*. The stepping motor units 49*a* and 49*b* respectively include a clutch (not shown). Consequently, the gear train becomes effective by being locked when the motor is driven. In contrast, when the motor is not driven, the gear train is cut off and the winding shaft side becomes freely rotatable by external force. Further, they are controlled by a feeding control unit included in the control circuit unit 32.

As shown in FIG. 2, the filter feed amount detection unit includes a pressure spring 50 so that the electrostatic filter 20 moving on the feed amount monitor shaft 37 comes into intimate contact with the feed amount monitor shaft 37. Consequently, when the electrostatic filter 20 is taken up, the feed amount monitor shaft 37 rotates in accordance with the movement of the electrostatic filter 20 by corresponding to the movement of the electrostatic filter 20 with certainty.

According to this configuration, the rotation amount of the feed amount monitor shaft 37 always corresponds to the feed amount of the filter. That is, although when the roll diameter of the filter wound around the second winding shaft 33*b* changes in the course of taking up the electrostatic filter 20, the time required for feeding a certain amount of the filter changes, the rotation amount of the feed amount monitor shaft 37 does not get affected by the change in the roll diameter.

As shown in FIG. 4, a rotation detecting reflection pattern 51 is provided at the end of the feed amount monitor shaft 37 protruded from the bottom of the small housing 34. A pattern detection sensor 52 of a photosensor is fixed to a device main body wall 53 so as to face the rotation detecting reflection pattern 51. Thus, the feed amount of the electrostatic filter 20 can be measured on the basis of a pattern detection output from the pattern detection sensor 52.

The control circuit unit 32 (see FIG. 1) controls the driving of the stepping motor unit 49*a* using a detection signal from the pattern detection sensor 52 so as to control the feed amount of the electrostatic filter 20 in an adequate condition.

By the way, the electrostatic filter initially has a high dust capture capability and its air permeability is also relatively high. However, when a large amount of dust adheres to the filter, the air permeability rapidly deteriorates and a pressure loss increases, causing a deterioration in the cooling capability. Further, even if the absorptive capability of the electrostatic filter still remains, the absorptive effect by static electricity weakens due to a large amount of dust adhered to the filter. According to the present embodiment, even in a case of long hours of use, the dust capture capability can be maintained automatically at a high level by carrying out appropriate control.

In the present embodiment, the small housing 34 of the dust capture unit 19 designed to be detachable is attached to the projection type image display apparatus so as to face the housing air intake 18, and in that state, the projection type image display apparatus is operated. When the projection type image display apparatus is kept being used, ambient dust is attracted together with outside air used for cooling. The dust flows into the device from the housing air intake 18, passes through the opening 35 of the small housing 34, and then is captured by the electrostatic filter 20 of the dust capture filter unit.

Accumulation of dust due to long hours of use inhibits the ventilation. Thus, in the present embodiment, an operation for renewing the soiled part of the electrostatic filter 20 positioned at the opening 35 with an unused part is carried out in accordance with a predetermined condition. The renewing operation starts in accordance with, for example, the cumulative operating time of the dust capture unit 19 measured by a timer or the state of clogging of the filter detected by the air volume sensor 31.

The operation of the dust capture unit 19 in association with the above renewing operation will be described with reference to FIGS. 2 and 5A to 5C. In the state shown in FIG. 2, dust removed from the electrostatic filter 20 is adhered to the movable brush 41 by the previous renewing operation. When the renewing operation starts, the first winding shaft 33*a* is rotated in the arrow direction in FIG. 2. Consequently, the electrostatic filter 20 whose one end is fixed to the first winding shaft 33*a* is taken up. That causes the second winding shaft 33*b* to be rotated through the guide shafts 36*a* and 36*b* and the feed amount monitor shaft 37, and the electrostatic filter 20 is pulled out from the second winding shaft 33*b*.

Due to this operation, the part of the electrostatic filter 20 located at the position facing the opening 35, on which dust is absorbed and accumulated, is fed to the first winding shaft 33*a* side and an unused part of the electrostatic filter 20 is placed at the position facing the opening 35. At this time, the conveyor unit 43 including the contact units 42 being in contact with the electrostatic filter 20 moves to the right in FIG. 2. At the same time, the movable brush 41 attached to the conveyor unit 43 also moves in the same direction.

Figure 5A:
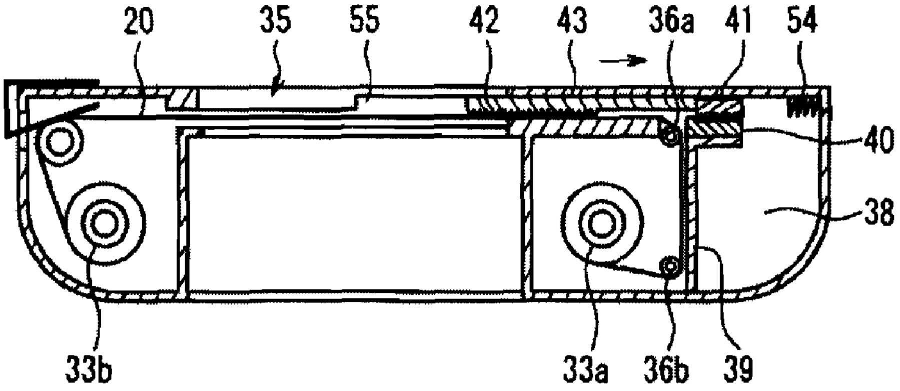
FIGS. 5A to 5C are cross-sectional views showing operation states of the dust capture unit.
Figure 5B:
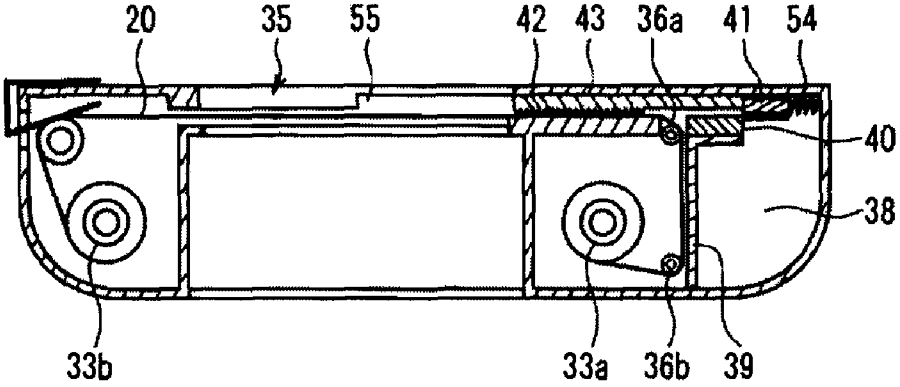

FIG. 5A shows the state after the movement. When the movable brush 41 moves in the right direction, it comes into contact with the fixed brush 40 provided on the separation wall 39. Subsequently, as shown in FIG. 5B, when the movable brush 41 arrives at the position overshooting the fixed brush 40, the conveyor unit 43 is damped by a push-back spring 54.

Further, using an output from the pattern detection sensor 52 that reads the rotation amount of the feed amount monitor shaft 37, the control circuit unit 32 detects the feed amount of the electrostatic filter 20 and controls the feed amount through the drive of the first winding shaft 33*a*. Even when the conveyor unit 43 reaches the state of being damped by the push-back spring 54, the first winding shaft 33*a* is kept driven until the take-up amount reaches a predetermined value. When the take-up amount reaches the predetermined value, the drive of the first winding shaft 33*a* is stopped. At this time, the surface of the electrostatic filter 20 facing the opening 35 is replaced entirely with an unused surface. Subsequently, drive of the second winding shaft 33*b* starts.

The second winding shaft 33*b* is rotated in the direction opposite to the arrow in FIG. 2. Accordingly, the electrostatic filter 20 whose one end is fixed to the second winding shaft 33*b* is rewound. That causes the first winding shaft 33*a* to be rotated through the feed amount monitor shaft 37, and the guide shafts 36*a* and 36*b*, and the electrostatic filter 20 is rewound.

Figure 5C:
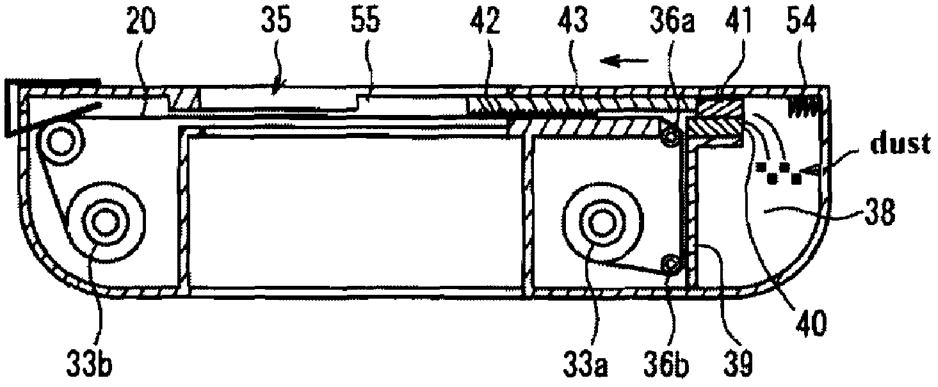

Due to this operation, through the contact units 42 in contact with the rewound electrostatic filter 20, the moveable brush 41 attached to the conveyor unit 43 moves in the left direction, as shown in FIG. 5C. At that time, the moveable brush 41 returns to the position shown in FIG. 2 while dropping the dust adhered thereto by coming into contact with the fixed brush 40.

In this state, although the conveyor unit 43 is stopped from moving by a fixed wall 55, the electrostatic filter 20 further continues to move. Consequently, dust on the electrostatic filter 20 is dropped by the movable brush 41, and adheres to the moveable brush 41. The dust adhered to the movable brush 41 is removed at the next renewing operation when being taken into the dust storage unit 38 separated from the dust capture filter unit by the separation wall 39 as a result of the operation shown in FIG. 5C.

As described above, the air permeability of the electrostatic filter 20 can be improved and the absorptive effect by static electricity also recovers. Thus, it is possible to reuse the same part.

The movable brush 41 may be formed of a magic brush having diagonally implanted hair, for example. It is desirable that the direction of the implanted hair is opposite to the rewind direction of the electrostatic filter 20 (the left direction in FIG. 2).

Next, the procedure of controlling the renewing operation performed in the above dust capture unit 19 will be described with reference to a flow chart shown in FIG. 6.

First, the dust capture unit 19 is activated by turning on the power of the projection type image display apparatus (Step S1). As a result, whether the condition for starting the renewing operation has been satisfied or not is determined (Step S2). The condition for starting the renewing operation is set on the basis of the cumulative operating time of the dust capture unit 19 measured by a timer or on the basis of the state of clogging of the filter detected by the air volume sensor 31, for example.

When the condition for starting the renewing operation is satisfied, the first winding shaft 33*a* is driven and the renewing operation starts (Step S3). While the first winding shaft 33*a* is being driven, the control circuit unit 32 detects the feed amount of the electrostatic filter 20 using an output from the pattern detection sensor 52, and determines whether or not the take-up amount has reached a predetermined value La (Step S4).

The drive of the first winding shaft 33*a* is stopped when the take-up amount reached the predetermined value La (Step S5). At this time, as shown in FIG. 5B, the moveable brush 41 comes into contact with the push-back spring 54 and the surface of the electrostatic filter 20 seen through the opening 35 is changed entirely to a new surface. Subsequently, drive of the second winding shaft 33*b* starts (Step S6).

The electrostatic filter 20 is rewound by the drive of the second winding shaft 33*b*. While the second winding shaft 33*b* is being driven, whether the rewind amount has reached the predetermined value Lb or not is determined (Step S7). The rewind amount Lb is set such that the rewind amount Lb and the take-up amount La satisfy the relationship $Lb \leqq La$. When the rewind amount has reached the predetermined value Lb, the drive of the second winding shaft 33*b* is stopped (Step S8) and the procedure returns to Step S2. In this way, the operation for controlling the renewing operation is repeated until the dust capture unit is deactivated.

The above operation can be performed even when the take-up amount La and the rewind amount Lb of the electrostatic filter 20 are equal to each other. However, since the dust collection capability of reused part of the filter further deteriorates, it is desirable to set the take-up amount La and the rewind amount Lb such that they satisfy the relationship $Lb \leqq La$, as described above. More desirably, they are set to satisfy the relationship $Lb \leqq La$.

Further, it is desirable that with respect to a length Lc which is the length of the opening 35 of the small housing 34 in the feeding direction of the electrostatic filter 20, the take-up amount La satisfies the relationship $La \geqq Lc$.

The feed amount monitor shaft 37 does not have to be placed at the above-described position and its position may be replaced with those of the guide shafts 36*a* and 36*b*.

Although a photosensor is used as the rotation detection units of the feed amount monitor shaft 37, a generally used contact switch, a non-contact Hall element or the like can also be used instead of the photosensor.

It is preferable that the dust storage unit 38 formed by partitioning the filter cleaning unit with the separation wall 39 is provided with a plurality of small separation walls in the direction parallel to each sheet of paper of FIGS. 5A to 5C, so that the dust storage unit 38 can be partitioned into a plurality of small cells. The direction in which dust is accumulated is fixed in one direction due to the difference in postures of the device. With this configuration, the operation of the conveyor unit 43 is less likely to be affected by the accumulation of dust. Thus, it is possible to use the dust storage unit 38 effectively.

Further, the electrostatic filter 20 is composed of an electrified fiber surface and a mesh surface, and is disposed such that the surface with which the brush comes into contact is the mesh surface (the upper direction in FIGS. 5A to 5C). By configuring in this way, the deterioration of the surface of the filter due to friction with the brush can be minimized.

Embodiment 2

Figure 6:
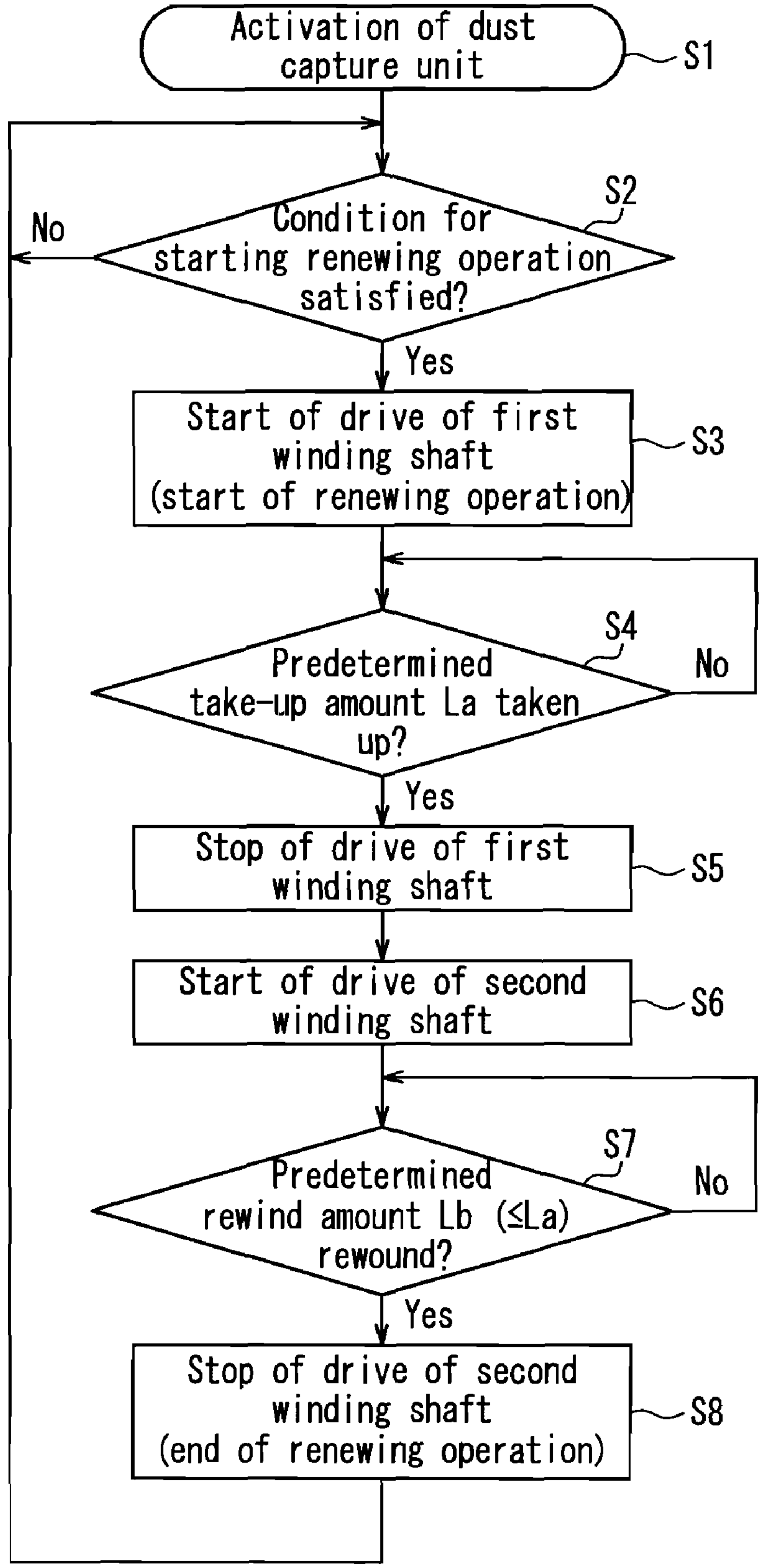
FIG. 6 is a flowchart showing the procedure of a renewing operation performed in the dust capture unit.
Figure 7:
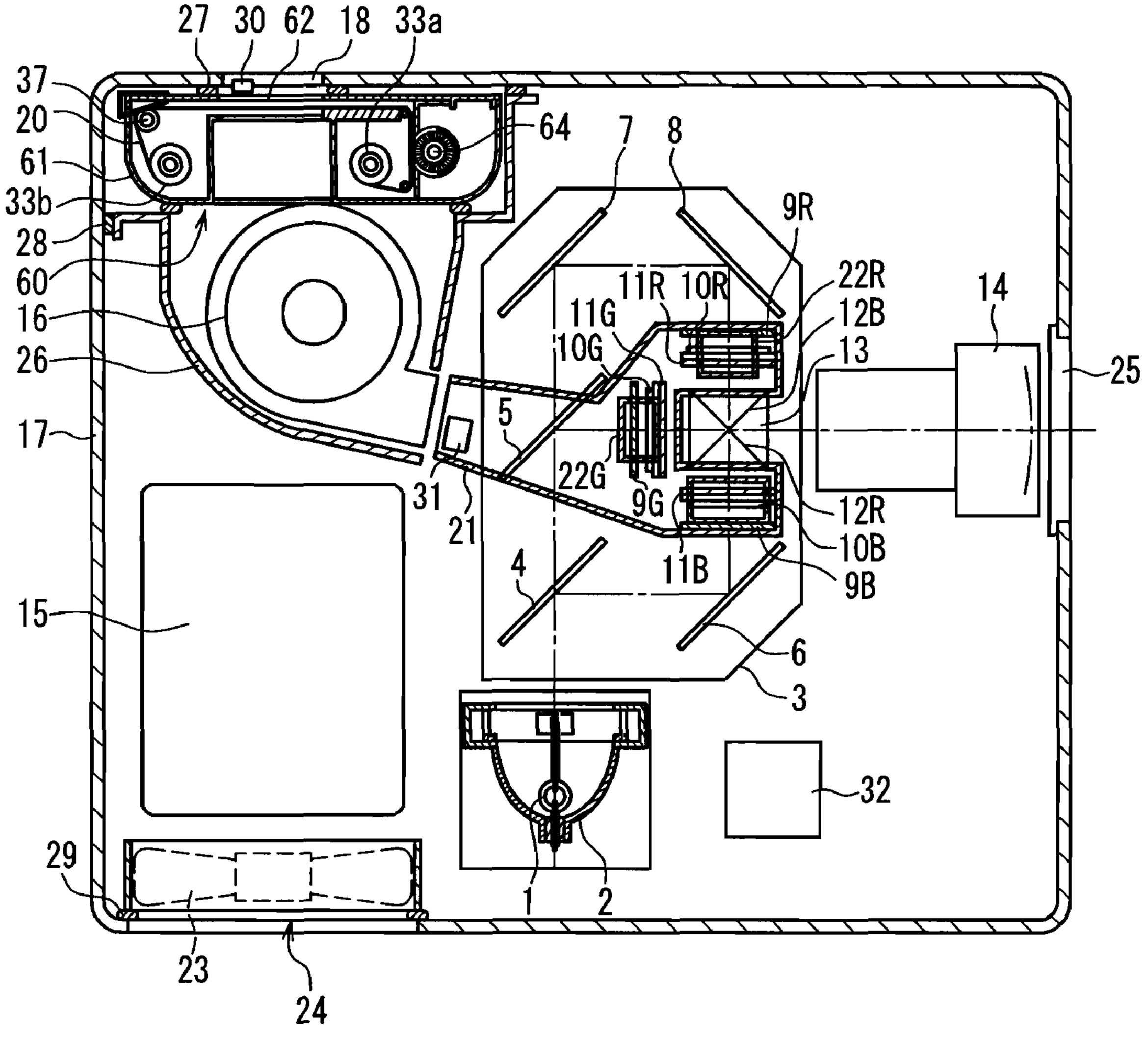
FIG. 7 is a cross-sectional view showing the entire planar configuration of a projection type image display apparatus according to Embodiment 2 of the present invention.

A projection type image display apparatus according to Embodiment 2 of the present invention employs a dust capture unit configured differently from that in Embodiment 1 but to which the method of controlling the dust capture unit in Embodiment 1 shown in FIG. 6 can be applied. FIG. 7 is a cross-sectional view showing the entire planar configuration of the projection type image display apparatus according to the present embodiment. Since this device has an optical configuration, etc., substantially similar to those in Embodiment 1, the same portions will be denoted with the same reference numerals and the description thereof will not be repeated.

In the present embodiment, a dust capture unit 60 having a different configuration from the dust capture unit 19 in Embodiment 1 is used. In the dust capture unit 60, a filter cleaning unit is composed of a rotation brush 64 instead of the fixed brush 40 and the movable brush 41 used in the dust capture unit 19 in Embodiment 1.

Hereinafter, the structure of the dust capture unit 60 will be described with reference to FIG. 8. It should be noted that the same elements as those in the dust capture unit 19 in Embodiment 1 will be denoted with the same reference numerals and the description thereof will not be repeated. Similarly to the dust capture unit 19, the dust capture unit 60 is composed of a dust capture filter unit, the filter cleaning unit, and a feeding mechanism control unit including a filter feeding mechanism and a filter feed amount detection means.

The dust capture filter unit is composed of an electrostatic filter 20, first and second winding shafts 33*a* and 33*b* and a small housing 61 that houses the electrostatic filter 20 and the first and second winding shafts 33*a* and 33*b* and includes a coupling unit coupled to the filter feeding mechanism. The small housing 61 includes an opening 62 having a size substantially the same as that of a housing air intake 18 and allowing air from the housing air intake 18 to flow in.

The filter cleaning unit is composed of separation walls 63*a* and 63*b* for separating the filter cleaning unit spatially from the dust capture filter unit, the rotation brush 64 rotatable in connection with the first winding shaft 33*a*, and a dust guard case 65 provided to cover the rotation brush 64.

Figure 9:
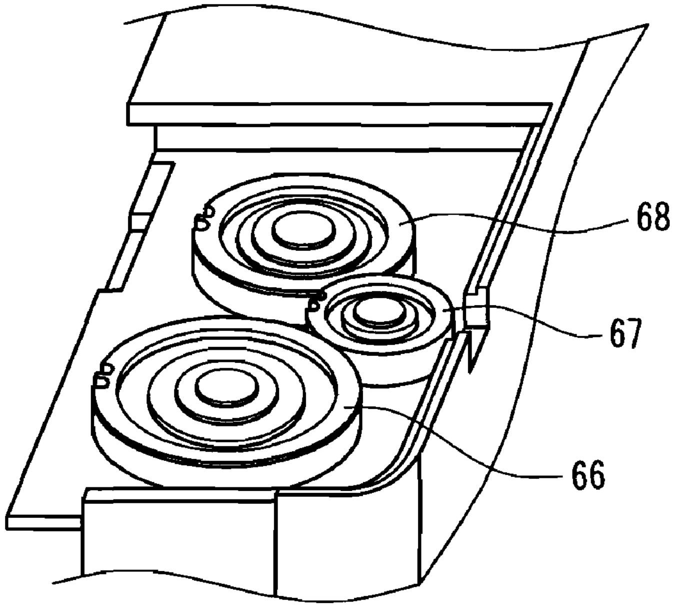
FIG. 9 is a perspective view showing the driving mechanism of a rotation brush in the dust capture unit.

FIG. 9 is a perspective view showing the driving mechanism of the rotation brush 64. A brush gear 66 shown in FIG. 9 is provided at an end portion of the rotation brush 64, and is connected, via a brush relay gear 67, to a winding shaft gear 68 provided at an end portion of the first winding shaft 33*a*.

Figure 8:
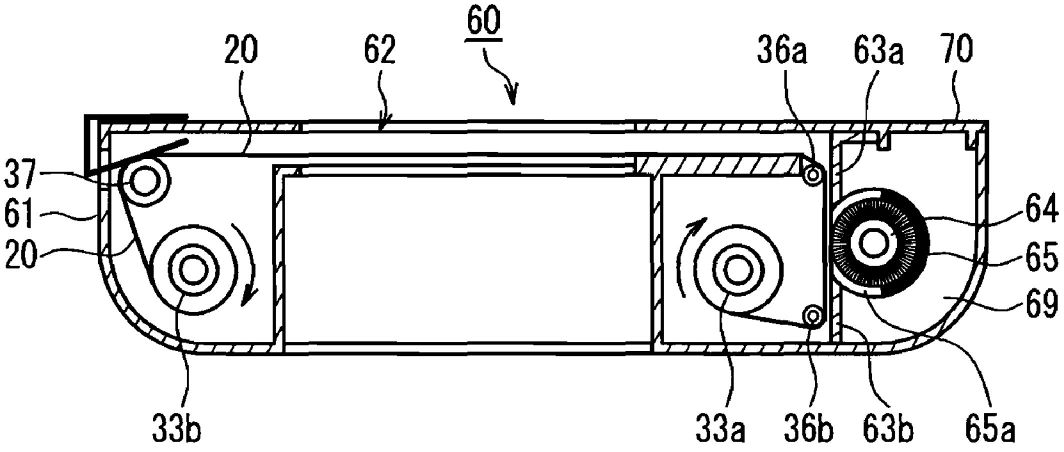
FIG. 8 is a cross-sectional view showing the structure of a dust capture unit of the projection type image display apparatus.

Consequently, when the electrostatic filter 20 is taken up, the rotation brush 64 rotates in the direction opposite to the direction in which the filter 20 is fed, and thereby dust is removed from the filter 20 moving between the guide shafts 36*a* and 36*b*, as shown in FIG. 8.

An opening 65*a* is formed in the dust guard case 65 in the vicinity of the separation walls 63*a* and 63*b*. The dust removed by the rotation brush 64 passes through the opening 65*a* and then is stored in a dust storage unit 69 separated by the separation walls 63*a* and 63*b*. A removable lid 70 is provided on a part of a wall surface that constitutes the dust storage unit 69 of the small housing 61, which makes removal of dust easy.

Similarly to Embodiment 1, the filter feeding mechanism is composed of a driving unit including a motor and a coupling unit for coupling the first and the second winding shafts 33*a* and 33*b* to the driving unit. The filter feed amount detection means has the same configuration as that in Embodiment 1.

Hereinafter, a driving system will be described with reference to FIG. 10. For brevity, the outer shape of gears is indicated by a pitch circle diameter in the drawing.

A gear 71*a* coupled to the first winding shaft 33*a* is connected to a DC motor 78 through a first reduction gear 72*a*, a relay gear 73*a*, a second reduction gear 74*a*, a switching gear 75*a*, a third reduction gear 76 and a worm 77. The switching gear 75*a* has a rotation center coaxial with the the third reduction gear 76 and is supported by an arm unit 79 having a switching gear 75*b* on the other end.

Figure 10:
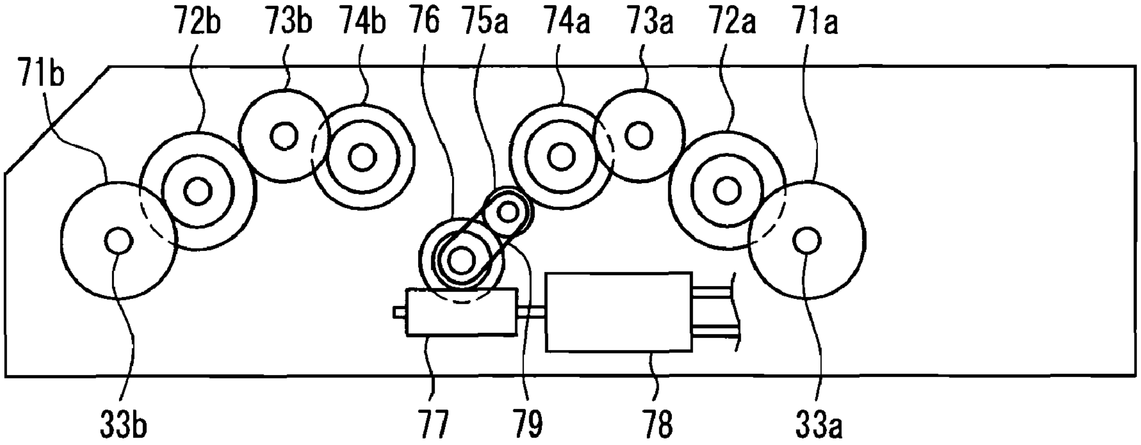
FIG. 10 is a plan view showing the driving mechanism in a take-up state.

In FIG. 10, the DC motor 78 is rotated, so that the third reduction gear 76 coupled to the worm 77 is rotated left-handedly, for example. At this time, the third reduction gear 76 transmits a driving force from the DC motor 78 by coming to the position in FIG. 10 to rotate the first winding shaft 33*a*. Consequently, the electrostatic filer 20 fixed to the shaft can be taken up.

In contrast, a gear 71*b* coupled to the second winding shaft 33*b* is connected to the DC motor 78 through a first reduction gear 72*b*, a relay gear 73*b*, a second reduction gear 74*b*, a switching gear 75*b*, the third reduction gear 76, and the worm 77.

Figure 11:
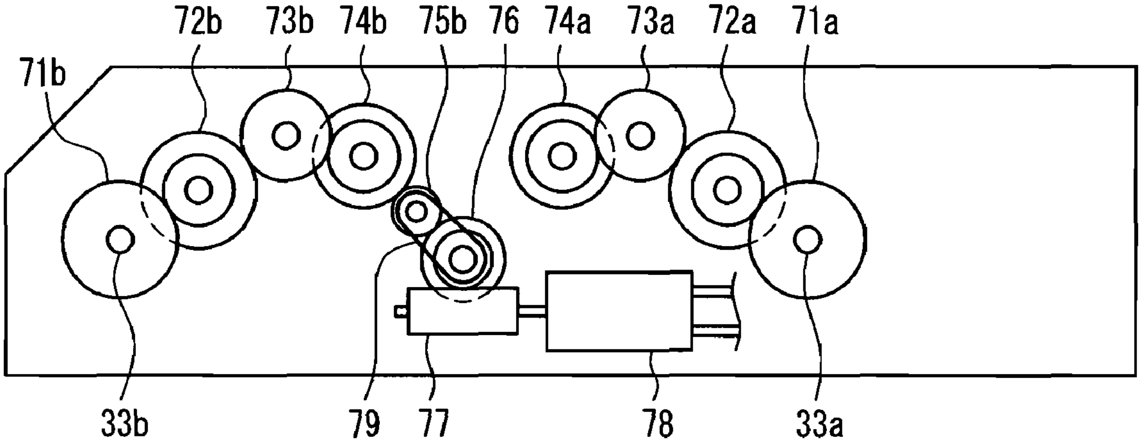
FIG. 11 is a plan view showing the driving mechanism in a rewinding state.

FIG. 11 shows the rewinding operation of the filter. The DC motor 78 rotates in the opposite direction from the time of taking up the filter to rotate the third reduction gear 76 coupled to the worm 77 right-handedly. At this time, the third reduction gear 76 transmits a driving force from the DC motor 78 by coming to the position in FIG. 11 to rotate the second winding shaft 33*b*. Consequently, the electrostatic filter 20 fixed to the shaft can be rewound.

The small housing 61 of the dust capture unit 60 designed to be detachable is attached to the projection type image display apparatus so as to face the housing air intake 18, and in that state, the projection type image display apparatus is operated. Accumulation of dust due to long hours of use inhibits the ventilation. Thus, an operation for renewing soiled part of the electrostatic filter 20 positioned at the opening 62 with unused part is carried out in accordance with a predetermined condition. The control at the time of the renewing operation described below can be performed in a similar manner as that in Embodiment 1 shown in FIG. 6.

When the renewing operation starts, the DC motor 78 starts operating and thereby the worm 77 and the third reduction gear 76 are rotated. Consequently, the switching gear 75*a* is moved around the center of the rotation shaft of the third reduction gear 76 in FIG. 10 and reaches the position in FIG. 10 and by transmitting a driving force to the second reduction gear 74*a*, the gear 71*a* is rotated through the relay gear 73*a* and the first reduction gear 72*a*.
And through the recessed portion 44*a* inserted in the coupling unit 45*a*, the first winding shaft 33*a* is rotated in the arrow direction in FIG. 8. Consequently, the electrostatic filter 20 is pulled out from the second winding shaft 33*b*, the part of the electrostatic filter 20 located at the position facing the opening 62, on which dust is absorbed and on which the dust is accumulated, is fed to the first winding shaft 33*a* side and unused part of the electrostatic filter 20 is placed at the position facing the opening 62.

At this time, the winding shaft gear 68 (see FIG. 9) provided at the end portion of the first winding shaft 33*a* is rotated, and thereby the brush gear 66 is driven via the brush relay gear 67. As a result, the rotation brush 64 rotates. Since the direction in which the rotation brush 64 rotates is opposite to the direction in which the electrostatic filter 20 is fed, dust on the filter is scraped off. The dust scraped off the filter passes through the opening 65*a* of the dust guard case 65 and then is stored in the dust storage unit 69.

The control circuit unit 32 detects the feed amount of the electrostatic filter 20 on the basis of an output pulse of the pattern detection sensor 52. On the basis of the detection signal, the feed amount, in other words, the take-up amount is controlled through the drive of the first winding shaft 33*a*. It is desirable that the take-up amount is the same or larger than the amount with which the filter of the portion exposed from the opening 62 and having dust arrives at the contact position with the rotation brush 64.

When the take-up amount has reached the predetermined value La, the drive of the first winding shaft 33*a* is stopped and the drive of the second winding shaft 33*b* starts. That is, by the DC motor 78 performing reverse operation, the worm 77 and the third reduction gear 76 are rotated reversely. Thereby, the switching gear 75*b* is moved around the center of the rotation shaft of the third reduction gear 76 in FIG. 11 and reaches the position in FIG. 11. By transmitting a driving force to the second reduction gear 74*b* in this way, the gear 71*b* is rotated through the relay gear 73*b* and the first reduction gear 72*b*. Thus, the second winding shaft 33*b* is rotated in the direction opposite to the arrow direction in FIG. 8. As a result, the electrostatic filter 20 whose one end is fixed to the second winding shaft 33*b* is rewound.

Due to this operation, the winding shaft gear 68 is rotated, thereby the brush gear 66 is driven via the brush relay gear 67, and the rotation brush 64 is rotated backwardly. Since the direction in which the rotation brush 64 is rotated is opposite to the direction in which the electrostatic filter 20 is rewound, dust on the filter is scraped off again. Also at this time, the dust scraped off the filter passes through the opening 65*a* of the dust guard case 65 and then is stored in the dust storage unit 69.

Then, a portion of the used part of the electrostatic filter 20 returns to the position facing the opening 62. As a result, the air permeability of the electrostatic filter 20 can be improved and the absorptive effect by static electricity also recovers. Thus, it is possible to reuse the same part.

Embodiment 3

Figure 12:
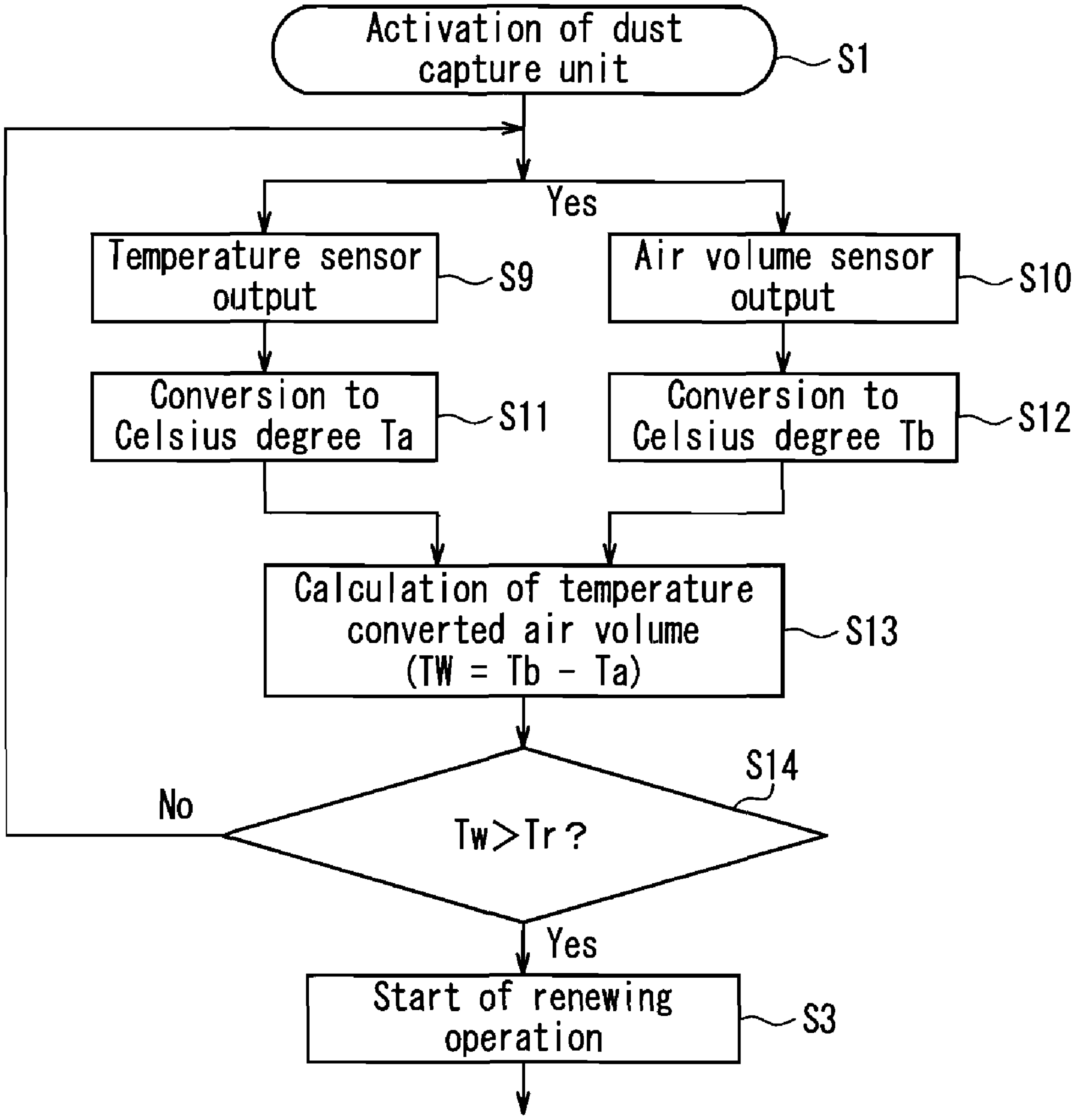
FIG. 12 is a flowchart showing the procedure of a renewing operation performed in a dust capture unit in Embodiment 3 of the present invention.

FIG. 12 is a flowchart showing a partial procedure of a renewing operation performed in a dust capture unit in Embodiment 3 of the present invention. The present embodiment is directed to the specific configuration of Step S2 (determining the condition for starting the renewing operation) in the procedure of the renewing operation shown in FIG. 6. Therefore, the procedural steps subsequent to Step S3 are not shown in the drawing. The procedure in the present embodiment is applicable when a projection type image display apparatus employs an entire configuration and a dust capture unit employs a configuration similar to those in Embodiment 1 or 2.

In the present embodiment, the condition for starting the renewing operation is set on the basis of the state of clogging of the filter detected by the air volume sensor 31. In this connection, since a detection output of the air volume sensor 31 is affected by outside air temperature, it is desirable to compensate for the output with the outside air temperature detected by the outside air temperature sensor 30. Accordingly, in the procedural steps shown in FIG. 12, the condition is determined using output signals from the air volume sensor 31 and the outside air temperature sensor 30.

When the dust capture unit is activated (Step S1), an output signal of the air volume sensor 31 is obtained (Step S9) and also an output signal of the outside air temperature sensor 30 is obtained (Step S10). The output signal of the air volume sensor 31 is converted into a Celsius degree Ta (Step S11) and also the output signal of the outside air temperature sensor 30 is converted into a Celsius degree Tb (Step S12).

Next, a temperature converted air volume TW ($TW=Tb-Ta$) is calculated at Step S13. As a result of this calculation, compensation for the air volume detected by the air volume sensor 31 with the outside air temperature outputted by the outside air temperature sensor 30 is performed on a Celsius basis. Although TW is a temperature value corresponding to the air volume, it is still used in the form of temperature value in the process performed at the next Step S14.

That is, at Step S14, a reference temperature Tr, which indicates the state of clogging of the electrostatic filter 20 set as the condition for starting the renewing operation, is compared with the temperature calculated air volume Tw. And then, when Tw and Tr satisfy the relationship $Tw>Tr$, the renewing operation starts (Step S3).

In this way, whether the condition for starting the renewing operation has been satisfied or not can be determined precisely on the basis of the degree of clogging of the electrostatic filter 20 as a reference in the procedure of the renewing operation.

The output of each sensor is, in most cases, not linear relative to temperature. Thus, when observing the difference between the outputs from the two different sensors, it is necessary to have data supplementary to the output difference that varies in accordance with an ambient temperature. According to the present embodiment, the outputs from the respective sensors are compared with each other after they are once converted into a Celsius degree. Thus, without holding many pieces of supplementary data, a correct value can be determined in an environment where an ambient temperature changes.

As described above, when determining whether the condition for starting the renewing operation has been satisfied or not using the degree of clogging of the electrostatic filter 20 as a reference, a time interval among a plurality of times of renewing operations varies. Therefore, it is desirable to set the relationship between the take-up amount La and the rewind amount Lb variably in accordance with the time interval among a plurality of times at which the renewing operation is activated.

Embodiment 4

Figure 13:
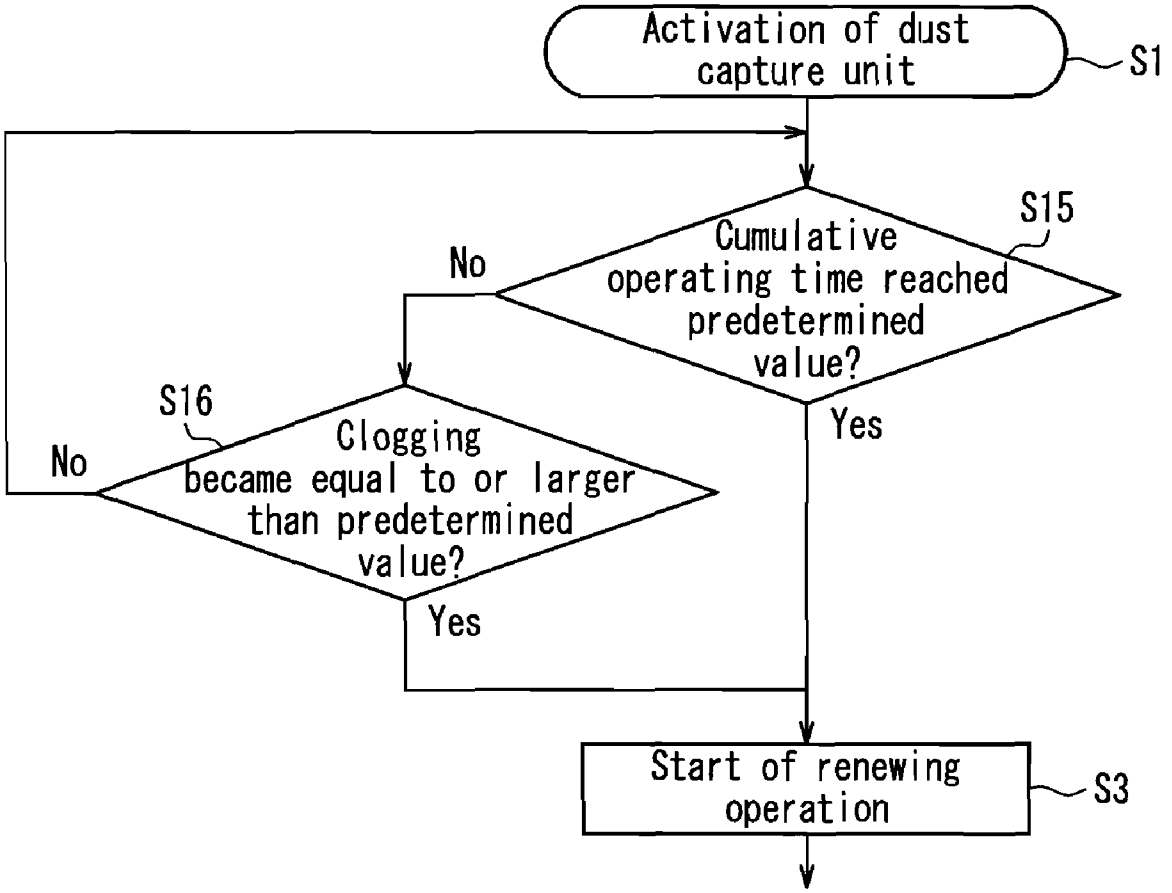
FIG. 13 is a flowchart showing the procedure of a renewing operation performed in a dust capture unit in Embodiment 4 of the present invention.

FIG. 13 is a flowchart showing a partial procedure of a renewing operation performed in a dust capture unit in Embodiment 4 of the present invention. The present embodiment is directed to Step S2 in the procedure of the renewing operation shown in FIG. 6 in another mode, which is different from that in Embodiment 3. The procedure in the present embodiment is applicable when a projection type image display apparatus employs an entire configuration and a dust capture unit employs a configuration similar to those in Embodiment 1 or 2.

In the present embodiment, Step S2 in the procedural steps of the renewing operation shown in FIG. 6 at which whether the condition for starting the renewing operation or not is determined is separated into two steps: Steps S15 and S16.

When the dust capture unit is activated (Step S1), first, whether the cumulative operating time of the dust capture unit has reached a predetermined value or not is determined (Step S15). The cumulative operating time can be measured using a timer included in the control circuit unit 32.

When the cumulative operating time has reached the predetermined value, the renewing operation starts (Step S3). When the cumulative operating time has not yet reached the predetermined value, then whether the clogging of the electrostatic filter 20 has become equal to or larger than a predetermined value or not is determined (Step S16). As described in Embodiment 3, the procedural step using the output signals of the volume sensor 31 and the outside air temperature 30 can be used to determine the state of clogging.

When the clogging of the electrostatic filter 20 is equal to or larger than the predetermined value, the renewing operation starts (Step S3). If not, then the procedure returns to Step S15.

By determining whether the condition for starting the renewing operation has been satisfied or not by the above setting, the renewing operation can be controlled appropriately in accordance with the circumstances in which the dust capture unit is used.

Furthermore, in addition to determining the start of the renewing operation using the cumulative operating time and the clogging of the filter as the conditions as described above, it is desirable that the projection type image display apparatus is provided with a mode for a user starting the renewing operation voluntarily.

Embodiment 5

Figure 14:
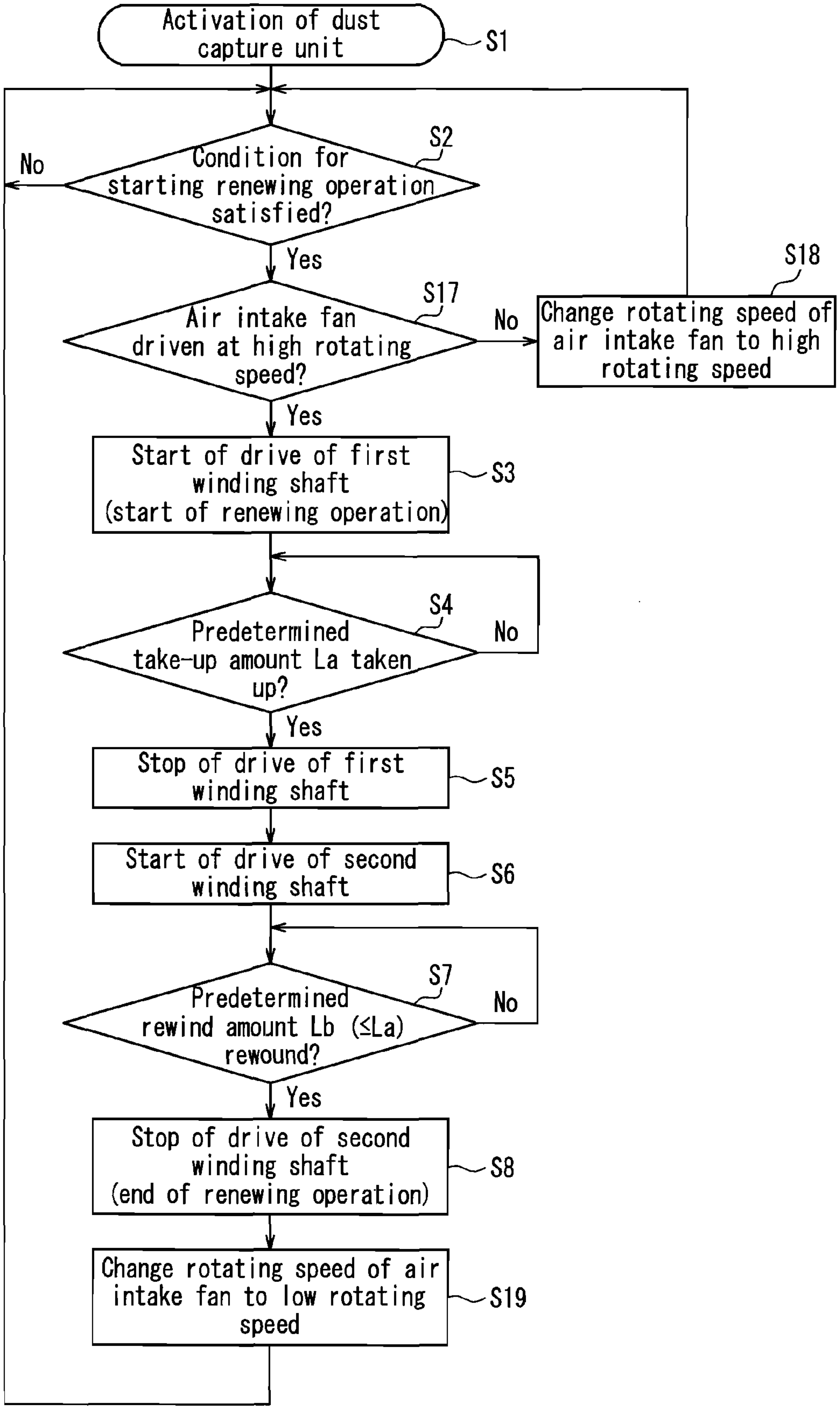
FIG. 14 is a flowchart showing the procedure of a renewing operation performed in a dust capture unit in Embodiment 5 of the present invention.

FIG. 14 is a flowchart showing the procedure of a renewing operation performed in a dust capture unit in Embodiment 5 of the present invention. In the present embodiment, along with the procedural steps of the renewing operation shown in FIG. 6, additional steps are performed. Accordingly, the same steps as those in the flowchart of FIG. 6 will be denoted with the same reference numerals and the description thereof will not be repeated. The procedure in the present embodiment is applicable when a projection type image display apparatus employs an entire configuration and a dust capture unit employs a configuration similar to those in Embodiment 1 or 2.

In the present embodiment, a step of controlling the operation of the air intake fan 16 is added to the procedure of the renewing operation shown in FIG. 6. In other words, when the condition for starting the renewing operation has been satisfied (Step S2), whether the air intake fan 16 is driven at a high rotating speed or not is determined (Step S17). The air intake fan 16 is driven selectively at at least between a predetermined low rotating speed and a predetermined high rotating speed, and the low rotating speed is selected at first.

When the air intake fan 16 is not driven at the high rotating speed, the rotating speed of the air intake fan 16 is changed to the high rotating speed without starting the renewing operation (Step S18) and the procedure returns to Step S2.

When the air intake fan 16 is driven at the high rotating speed, the procedure advances to Step S3 and the renewing operation is performed. After the renewing operation ends at Step S8, at Step S19, the rotating speed of the air intake fan 16 is changed to the low rotating speed (Step S19). Thereafter, the procedure returns to Step S2.

As described above, the renewing operation is not performed every time the condition for starting the renewing operation is satisfied. First, an attempt is made to maintain the cooling capability by changing the rotating speed of the air intake fan 16 to the high rotating speed. The renewing operation is performed when the cooling capability cannot be maintained even by changing the rotation speed. As a result, the life of the electrostatic filter 20, in other words, the usable time of the filter, can be extended.

Embodiment 6

Figure 15:
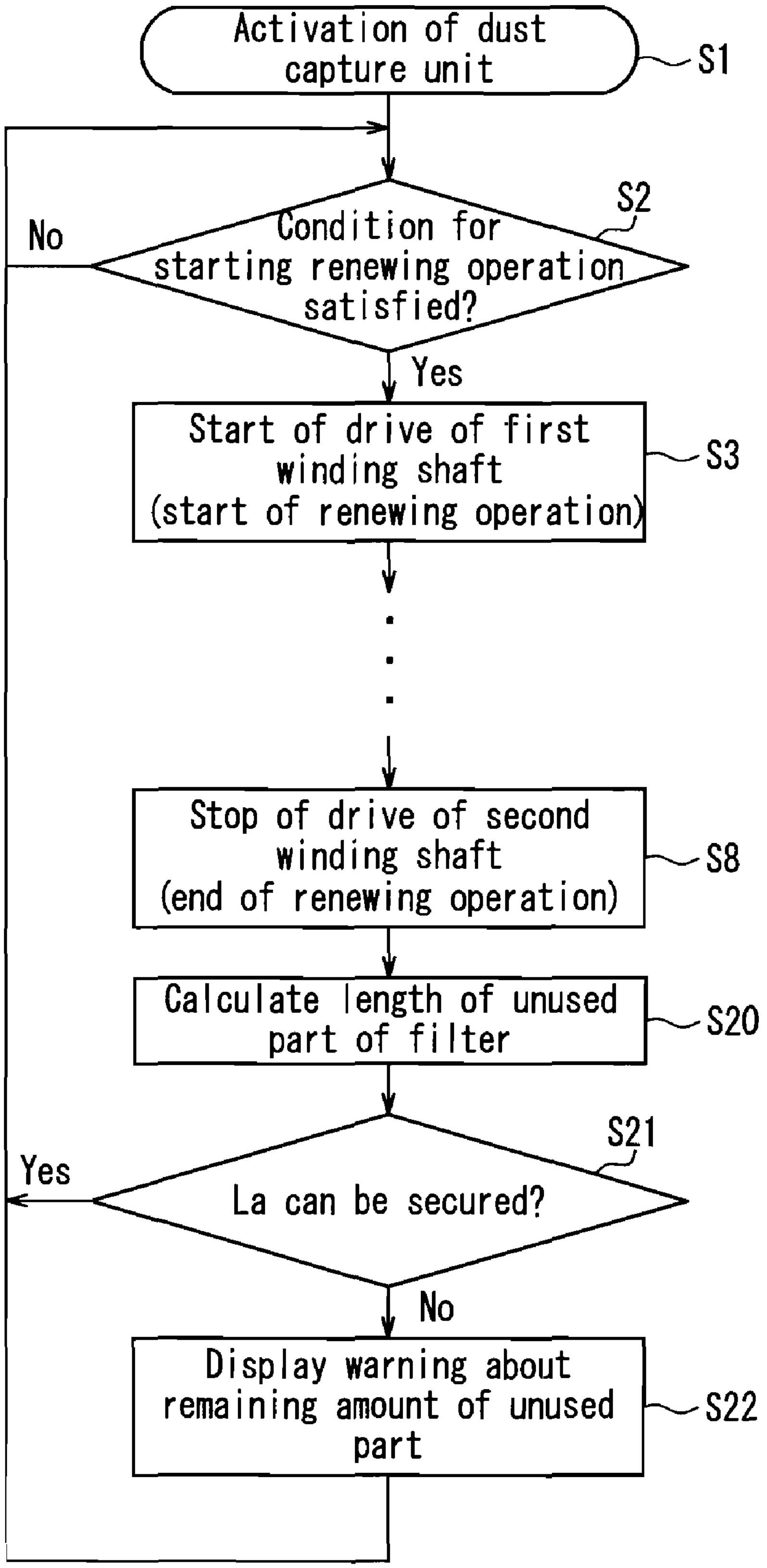
FIG. 15 is a flowchart showing the procedure of a renewing operation performed in a dust capture unit in Embodiment 6 of the present invention.

FIG. 15 is a flowchart showing the procedure of a renewing operation performed in a dust capture unit in Embodiment 6 of the present invention. In the present embodiment, along with the procedural steps of the renewing operation shown in FIG. 6, additional steps are performed. Accordingly, the same steps as those in the flowchart of FIG. 6 will be denoted with the same reference numerals and the description thereof will not be repeated. Further, Steps S4 to S7, which are the same processes as those in FIG. 6, are not shown in the drawing. The procedure in the present embodiment is applicable when a projection type image display apparatus employs an entire configuration and a dust capture unit employs a configuration similar to those in Embodiment 1 or 2.

In the present embodiment, Step S20, at which the length of unused part of the filter is calculated, and the steps afterwards are added to the procedure of the renewing operation shown in FIG. 6 after the renewing operation ends (Step S8).

The length of the unused part of the filter easily can be calculated on the basis of the length that the filter originally had when it was first attached to the dust capture unit and the fed length each time the renewing operation was repeated. On the basis of the length of unused part calculated at Step S20, whether the take-up amount La can be secured (the calculated length is longer than the take-up amount La) or not is determined (Step S21). If the take-up amount La can be secured, then the procedure returns to Step S2.

If the take-up amount La cannot be secured, then a warning about the remaining amount of the unused part is displayed (Step S22), and thereafter the procedure returns to Step S2.

By carrying out such control, it is possible to avoid a situation where the renewing operation is unable to perform while a user is not aware of the length of unused part of the filter.

When it is determined that the take-up amount La cannot be secured at Step S21, by reducing the take-up amount La so that La becomes equal to the rewind amount Lb at Step S7 (see FIG. 6), it is possible to control the dust capture unit such that only cleaning operation is carried out without renewing the filter.

In the present embodiment, whether the take-up amount La can be secured or not is determined. However, whether the remaining feed amount, in other words, the number of feeding has reached a predetermined value or not, can be used as a reference similarly to the above case.

Embodiment 7

Figure 16:
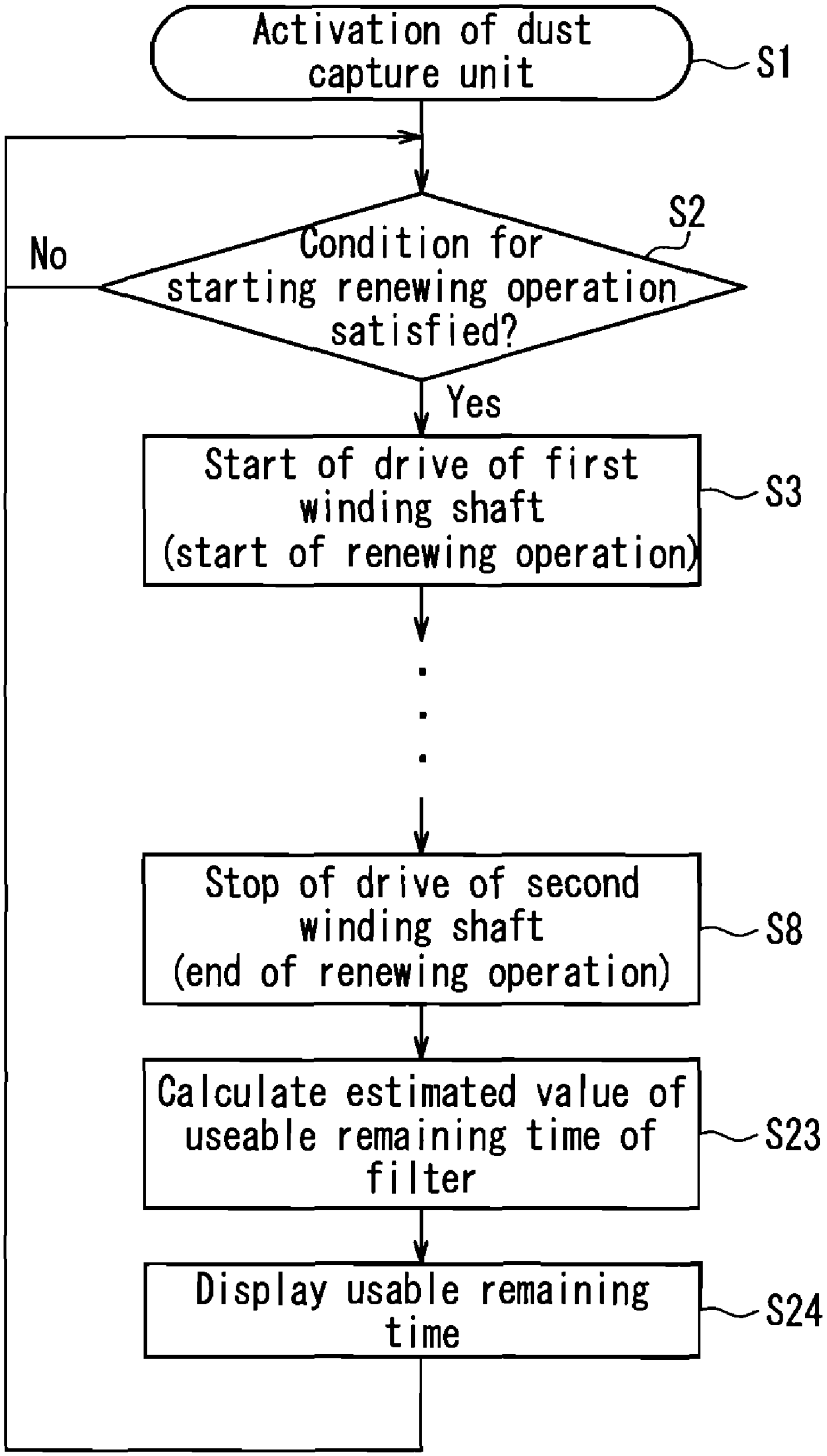
FIG. 16 is a flowchart showing the procedure of a renewing operation performed in a dust capture unit in Embodiment 7 of the present invention.

FIG. 16 is a flowchart showing the procedure of a renewing operation performed in a dust capture unit in Embodiment 7 of the present invention. In the present embodiment, along with the procedural steps of the renewing operation shown in FIG. 6, additional steps are performed. Accordingly, the same steps as those in the flowchart of FIG. 6 will be denoted with the same reference numerals and the description thereof will not be repeated. Further, Steps S4 to S7, which are the same processes as those in FIG. 6, are not shown in the drawing. The procedure in the present embodiment is applicable when a projection type image display apparatus employs an entire configuration and a dust capture unit employs a configuration similar to those in Embodiment 1 or 2.

In the present embodiment, Step S23, at which an estimated value of usable remaining time of the filter is calculated, and the steps afterwards are added to the procedure of the renewing operation shown in FIG. 6 after the renewing operation ends (Step S8). The usable remaining time calculated at Step S23 is displayed to warn a user (Step S24).

It is desirable that the usable remaining time is calculated on the basis of a time interval among a plurality of times at which the renewing operation is activated. As an example, the usable remaining time can be calculated as follows.

The following are used as calculation parameters: k, ΣUt, Pm, and N. k denotes the number of the renewing operations performed from the beginning of use of the filter, ΣUt denotes cumulative use time from the beginning of use of the filter, Pm denotes maximum partial use time assumed to be the maximum time in which part of the filter facing the opening 35 can be used by one renewing operation, and N denotes the number of performable renewing operations for the entire length of the filter.

Usable remaining time Rt is calculated by the following formula (1).

$$Rt=[\{\Sigma Ut+(N+1-k)\times Pm\}/(N+1)]\times(N+1-k) \quad (1)$$

In this calculation method, the actually used cumulative use time ΣUt is used for the used part of the filter and the maximum partial operation time Pm is applied to the unused part, and the estimated cumulative use time {ΣUt+(N+1−k)×Pm} in the case where the entire length of the filter is used is calculated.

(N+1) indicates the number of part areas of the entire length of the filter that can be used by each renewing operation. Therefore, by dividing the estimated cumulative use time with the number of part areas (N+1), estimated average use time per part area is calculated. By multiplying the remaining number of performable renewing operations at the point of the calculation (N+1−k) by the estimated average operating time, the usable remaining time Rt is calculated.

As described above, since the initial value of the usable remaining time Rt is decided by the maximum part use time Pm, the usable remaining time Rt only declines once the usage starts. Further, since the usable remaining time Rt is estimated by reflecting the actual usage situations until the point of calculation, it is possible to provide to an user an adequate estimated value of the length that is in line with the facts as the useable remaining time Rt.

Embodiment 8

Figure 17:
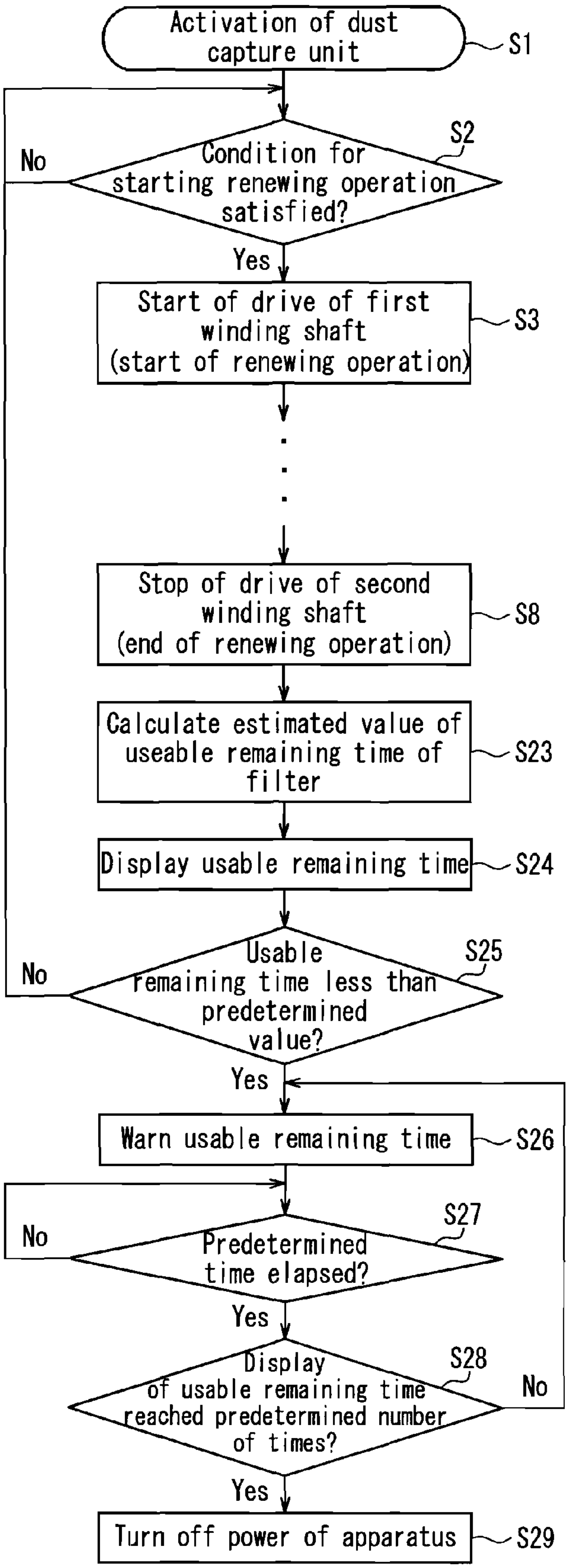
FIG. 17 is a flowchart showing the procedure of a renewing operation performed in a dust capture unit in Embodiment 8 of the present invention.

FIG. 17 is a flowchart showing the procedure of a renewing operation performed in a dust capture unit in Embodiment 8 of the present invention. In the present embodiment, along with the procedural steps of the renewing operation shown in FIG. 6, additional steps are performed. Accordingly, the same steps as those in the flowchart of FIG. 6 will be denoted with the same reference numerals and the description thereof will not be repeated. Further, Steps S4 to S7, which are the same processes as those in FIG. 6, are not shown in the drawing. The procedure in the present embodiment is applicable when a projection type image display apparatus employs an entire configuration and a dust capture unit employs a configuration similar to those in Embodiment 1 or 2.

In the present embodiment, similarly to the renewing operation in Embodiment 7 shown in FIG. 16, Step S23, at which the usable remaining time of the filter is calculated, and the steps afterwards are added after the renewing operation ends (Step 8). As an example, the method described in Embodiment 7 can be used to calculate the usable remaining time.

After displaying, at Step S24, the usable remaining time calculated at Step S23, whether the calculated usable remaining time is less than a predetermined value or not is determined (Step S25). When the useable remaining time is equal to or larger than the predetermined value, then the procedure returns to Step S2.

When the usable remaining time is less than the predetermined value, the procedure advances to Step S26 and the useable remaining time is warned. Then, the procedure advances to Step S27, and a predetermined time elapses. After the predetermined time has elapsed, whether the display of the usable remaining time has reached a predetermined number of times or not is determined (Step S28). If the display has not yet reached the predetermined number of times, the procedure returns to Step S26. If the display has reached the predetermined number of times, the procedure advances to Step S29 and the power of the projection type image display apparatus is turned off.

For example, in a case where the predetermined value at Step S25 is set to 10 minutes, the predetermined time at Step S27 is set to 1 minute and the predetermined number of times at Step S28 is set to 9, the following occurs.

For example, the useable remaining time (e.g., 200 hours) is displayed to call a user's attention when the last renewing operation is carried out. When the filter is kept used and the usable remaining time falls below 10 minutes, for example, a warning about the useable remaining time is displayed at Step S26. Thereafter, through Steps S26 to S28, the warning display is repeated every one minute. After the warning display is repeated nine times, the power of the projection type image display apparatus is turned off. Therefore, by turning off the power of the projection type image display apparatus when the useable remaining time of the filter ran out, it is possible to avoid a situation where the power of the projection type image display apparatus is turned off unexpectedly to a user.

By controlling the renewing operation performed in the dust capture unit in accordance with the procedure described each of the above embodiments, the number of filter renewing operations can be reduced while delivering adequate filter performance.

When some kind of accident happens and the renewing operation in each of the above embodiment is unable to complete, it is desirable to notify a user about the situation. Or, when once the power of the projection type image display apparatus is turned off due to the renewing operation not being able to complete, regardless of the operation state prior to the power down, it is desirable that the operation of the dust capture device starts from the take-up operation by the first winding shaft after the power is turned on again. This is to avoid the dust capture device from becoming inoperable since rewind operation by the second winding shaft cannot be performed right after the filter is renewed.

In the above embodiments, the electrostatic filter has been used as an example of the dust capture filter. However, since the electrostatic filter is relatively expensive, a windable filter material, such as a cloth having openings among fibers can be used, for example. However, since its dust collection capability is poorer than that of the electrostatic filter, it is necessary to optimize a method of feeding the filter in accordance with its filter characteristics.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection type image display apparatus comprising a housing having at least an air intake and an exhaust, a blower unit for intaking or exhausting air, a light source unit, an image forming unit, a projection optical system, a power supply unit, and a dust capture device, the dust capture device comprising:

first and second winding shafts disposed at a predetermined spacing;

a rolled filter stretched between the first and the second winding shafts, unused part of the filter being wound around the second winding shaft;

an opening provided between the first and second winding shafts so as to allow an air to flow through the filter;

a brush provided at a predetermined position between the first and the second winding shafts so as to come into contact with a surface of the filter;

a feeding mechanism for driving the first and the second winding shafts to take up or rewind the filter using the first and the second winding shafts; and a feeding control unit for controlling the feeding mechanism, wherein when a set condition is detected, the feeding control unit activates a renewing operation for feeding unused part of the filter from the second winding shaft to the opening, in which the feeding control unit controls the feeding mechanism such that once the filter is taken up by the first winding shaft by a take-up amount La, then the filter is rewound by the second winding shaft by a rewind amount Lb, and La and Lb satisfy a relationship La≧Lb, and the feeding control unit repeats the renewing operation every time the set condition is detected.

2. The projection type image display apparatus according to claim 1, further comprising a small housing for storing at least the filter, the first and the second winding shafts, and the brush, the small housing including the opening.

3. The projection type image display apparatus according to claim 2, wherein when a length of the opening of the small housing in a feeding direction of the filter is Lc, La and Lc satisfy a relationship La≧Lc.

4. The projection type image display apparatus according to claim 2, wherein the brush is disposed between an end of the opening of the small housing on a first winding shaft side and the first winding shaft.

5. The projection type image display apparatus according to claim 1, wherein the brush is disposed linearly in the same direction as the feeding direction of the filter.

6. The projection type image display apparatus according to claim 1, wherein the brush is provided on a shaft including a rotation shaft in a direction orthogonal to the feeding direction of the filter.

7. The projection type image display apparatus according to claim 6, wherein the brush is rotated in a direction opposite to the feeding direction of the filter.

8. The projection type image display apparatus according to claim 5, wherein the brush is composed of a movable brush that can be moved and a fixed brush that is fixed, and the movable brush moves in association with movement of the filter so as to come into contact with the fixed brush.

9. The projection type image display apparatus according to claim 8, wherein the movable brush is stopped from moving while the filter is rewound by the second filter winding shaft and captures dust adhered to the surface of the filter.

10. The projection type image display apparatus according to claim 9, wherein when the filter is taken up by the first winding shaft, the movable brush moves in association with movement of the filter and temporarily passes a position of the fixed brush, and next time when the filter is rewound by the second winding shaft, the movable brush moves in association with movement of the filter and comes into contact with the fixed brush, so that the captured dust is removed.

11. The projection type image display apparatus according to claim 8, wherein the movable brush and the fixed brush are magic brushes having slant hair.

12. The projection type image display apparatus according to claim 2, wherein the small housing includes a dust storage unit separated from a storage position of the filter by a separation wall.

13. The projection type image display apparatus according to claim 12, wherein a separation wall is provided between the brush and the dust storage unit.

14. The projection type image display apparatus according to claim 12, wherein the dust storage unit is provided with a plurality of partitions and the plurality of partitions are disposed such that dust is not accumulated in one side.

15. The projection type image display apparatus according to claim 14, wherein the plurality of partitions provided in the dust storage unit are provided in a direction orthogonal to a direction of the rotation shaft of the brush.

16. The projection type image display apparatus according to claim 12, wherein an openable discharge opening for dust is provided in the dust storage unit of the small housing.

17. The projection type image display apparatus according to claim 1, wherein the filter is an electrostatic filter.

18. The projection type image display apparatus according to claim 17, wherein the electrostatic filter is composed of an electrified fiber surface and a mesh surface, and a surface to which the brush comes into contact is the mesh surface.

19. The projection type image display apparatus according to claim 1, wherein a condition for activating the renewing operation by the feeding control unit is set on the basis of an output of a temperature sensor for detecting a temperature of air prior to passing through the filter and an output of an air volume sensor for detecting a volume of air that passed through the filter.

20. The projection type image display apparatus according to claim 19, wherein the air volume sensor includes a heat receiving unit and a heat generating unit, so that a change in output of the heat receiving unit due to air passing through between the heat receiving unit and the heat generating unit corresponds to an air volume, and the feeding control unit activates the renewing operation on condition that a temperature difference calculated from values determined by converting outputs of the air volume sensor and those of the temperature sensor into Celsius degrees exceeds a predetermined value.

21. The projection type image display apparatus according to claim 20, wherein a relationship between the take-up amount La and the rewind amount Lb can be set variably in accordance with the respective time intervals among a plurality of times at which the renewing operation is activated.

22. The projection type image display apparatus according to claim 19, wherein along with the condition set on the basis of the outputs of the temperature sensor and the air volume sensor, the feeding control unit uses passage of a predetermined operating time as a condition for activating the renewing operation to control the feeding mechanism.

23. The projection type image display apparatus according to claim 19 further comprising an air intake fan for intaking outside air through the surface of the filter at the opening, wherein when the feeding control unit detects that the condition for activating the renewing operation on the basis of the outputs of the temperature sensor and the air volume sensor is satisfied, at first the feeding control unit controls to increase a rotation speed of the air intake fan to a predetermined value without driving the first and the second winding shafts, and when the feeding control unit detects again that the condition for activating the renewing operation is satisfied, then the feeding control unit controls to drive the first and the second winding shafts.

24. The projection type image display apparatus according to claim 1, wherein when a remaining amount of unused part of the filter wound around the second winding shaft decreases and La cannot be secured or the remaining amount reaches a predetermined value, a warning about the remaining amount of unused part of the filter is displayed to a user.

25. The projection type image display apparatus according to claim 19, wherein when the condition for activating the renewing operation is satisfied in a state where a remaining amount of unused part of the filter wound around the second winding shaft is decreased and La cannot be secured or the remaining amount reaches a predetermined value, the feeding mechanism is controlled by reducing the take-up amount La so that La becomes equal to Lb.

26. The projection type image display apparatus according to claim 21, wherein the feeding control unit calculates an estimated value of useable remaining time of the filter on the basis of the respective time intervals among the plurality of times at which the renewing operation is activated.

27. The projection type image display apparatus according to claim 25, wherein when k represents a number of the renewing operations performed from the beginning of use of the filter, ΣUt represents cumulative use time from the beginning of use of the filter, Pm represents maximum partial use time assumed to be the maximum time in which part of the filter can be used by one renewing operation, and N represents a number of the renewing operations performable for a total length of the filter, the estimated value of the usable remaining time Rt is calculated by the following formula:

$$Rt=[\{\Sigma Ut+(N+1-k)\times Pm\}/(N+1)]\times(N+1-k).$$

28. The projection type image display apparatus according to claim 25, wherein when the filter is kept used without being renewed after the useable remaining time is displayed once, the feeding control unit performs such control that the usable remaining time is displayed again when the usable remaining time becomes equal to or less than a setting value, thereafter the usable remaining time is displayed repeatedly for a predetermined number of times at a predetermined time interval, and subsequently power of a device using the dust capture device is turned off.

29. The projection type image display apparatus according to claim 1, wherein when the renewing operation cannot be completed, an indicator thereof is displayed to notify a user.

30. The projection type image display apparatus according to claim 1, wherein when the renewing operation cannot be completed, power of an apparatus using the dust capture device first is turned off, and after the power is turned again, operation of the dust capture device starts from a take-up operation by the first winding shaft regardless of an operation state prior to the power down.

31. The projection type image display apparatus according to claim 1, wherein the dust capture device is detachable from a main body of the projection type image display apparatus.

32. The projection type image display apparatus according to claim 1, wherein the air intake of the projection type image display apparatus and the opening of the small housing of the dust capture device have substantially a same size.

* * * * *